US008634334B2

(12) United States Patent
Ahmadi

(10) Patent No.: US 8,634,334 B2
(45) Date of Patent: Jan. 21, 2014

(54) BASE STATION AND METHOD FOR CONFIGURING SUB-FRAMES FOR RELAY-NODE OPERATIONS

(75) Inventor: Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/530,686

(22) Filed: Jun. 22, 2012

(65) Prior Publication Data

US 2012/0263135 A1 Oct. 18, 2012

Related U.S. Application Data

(63) Continuation of application No. 12/611,487, filed on Nov. 3, 2009, which is a continuation-in-part of application No. 11/907,808, filed on Oct. 17, 2007, now Pat. No. 7,885,214.

(60) Provisional application No. 60/852,891, filed on Oct. 17, 2006.

(51) Int. Cl.
*H04L 5/14* (2006.01)

(52) U.S. Cl.
USPC .......................................... 370/295; 370/343

(58) Field of Classification Search
USPC .......................................... 370/208, 295, 343
See application file for complete search history.

(56) References Cited

U.S. PATENT DOCUMENTS

| | | | |
|---|---|---|---|
| 6,885,868 B1 * | 4/2005 | Naim et al. ................. | 455/452.1 |
| 7,885,214 B2 | 2/2011 | Ahmadi et al. | |
| 8,462,676 B2 | 6/2013 | Ahmadi | |
| 2007/0058595 A1 | 3/2007 | Classon et al. | |
| 2007/0217353 A1 | 9/2007 | Asa et al. | |
| 2008/0084892 A1 | 4/2008 | Sheen et al. | |
| 2008/0089282 A1 * | 4/2008 | Malladi et al. ................ | 370/329 |
| 2008/0095195 A1 | 4/2008 | Ahmadi et al. | |
| 2008/0107062 A1 | 5/2008 | Viorel et al. | |
| 2008/0165881 A1 | 7/2008 | Tao et al. | |
| 2008/0232278 A1 * | 9/2008 | Brunel et al. ................ | 370/275 |
| 2008/0285500 A1 * | 11/2008 | Zhang et al. ................. | 370/315 |
| 2009/0219842 A1 | 9/2009 | Moon et al. | |
| 2011/0002430 A1 | 1/2011 | Kim et al. | |
| 2011/0103494 A1 | 5/2011 | Ahmadi | |

FOREIGN PATENT DOCUMENTS

| | | |
|---|---|---|
| CN | 102668468 A | 9/2012 |
| JP | 2005303826 A | 10/2005 |
| JP | 2009533943 A | 9/2009 |
| WO | WO-2009052420 A2 | 4/2009 |

(Continued)

OTHER PUBLICATIONS

"U.S. Appl. No. 12/611,487, Response filed May 17, 2012 to Non Final Office Action mailed Jan. 17, 2012", 8 pgs.

(Continued)

*Primary Examiner* — Sai-Ming Chan

(74) *Attorney, Agent, or Firm* — Schwegman, Lundberg & Woessner, P.A.

(57) ABSTRACT

A frame structure for support of large delay spread deployment scenarios (e.g., cellular system operation in large cell sizes or low frequency bands) is generally presented. In this regard a method is introduced comprising partitioning a radio frame into a plurality of equal-sized (or non-equal-sized) sub-frames to simplify system implementation. Other embodiments are also disclosed and claimed.

27 Claims, 14 Drawing Sheets

(56) References Cited

FOREIGN PATENT DOCUMENTS

| WO | WO-2009102180 A1 | 8/2009 |
| WO | WO-2011056299 A2 | 5/2011 |
| WO | WO-2011056299 A3 | 5/2011 |

OTHER PUBLICATIONS

"U.S. Appl. No. 12/611,487, Information Disclosure Statement mailed Aug. 30, 2011", 4 pgs.

"U.S. Appl. No. 12/611,487, Notice of Publication mailed May 5, 2011", 1 pgs.

"International Application Serial No. PCT/US2010/048971, International Preliminary Report on Patentability mailed May 8, 2012", 7 pgs.

"International Application Serial No. PCT/US2010/048971, International Search Report and Written Opinion mailed Jun. 8, 2011", 11 pgs.

"International Application Serial No. PCT/US2010/048971, International Search Report mailed Jun. 8, 2011", 2 pgs.

"International Application Serial No. PCT/US2010/048971, Written Opinion mailed Jun. 8, 2011", 6 pgs.

"U.S. Appl. No. 12/611,487, Non Final Office Action mailed Sep. 14, 2012", 15 pgs.

"U.S. Appl. No. 12/611,487, Notice of Allowance mailed Feb. 8, 2013", 12 pgs.

"U.S. Appl. No. 12/611,487, Response filed Dec. 12, 2012 to Non Final Office Action mailed Sep. 14, 2012", 9 pgs.

Japanese Application Serial No. 2012-536812, Office Action mailed Jul. 30, 2013.

Korean Application Serial No. 10-2012-7011368, Notice of Preliminary Rejection mailed Sep. 5, 2013, 4 pgs.

Russian Application Serial No. 2012122823, Office Action mailed May 24, 2013.

Taiwanese Application Serial No. 099130073, Office Action mailed May 27, 2013, 24 pgs.

Taiwanese Application Serial No. 099130073, Response filed Aug. 27, 2013 to Office Action mailed May 27, 2013, 12 pgs.

\* cited by examiner

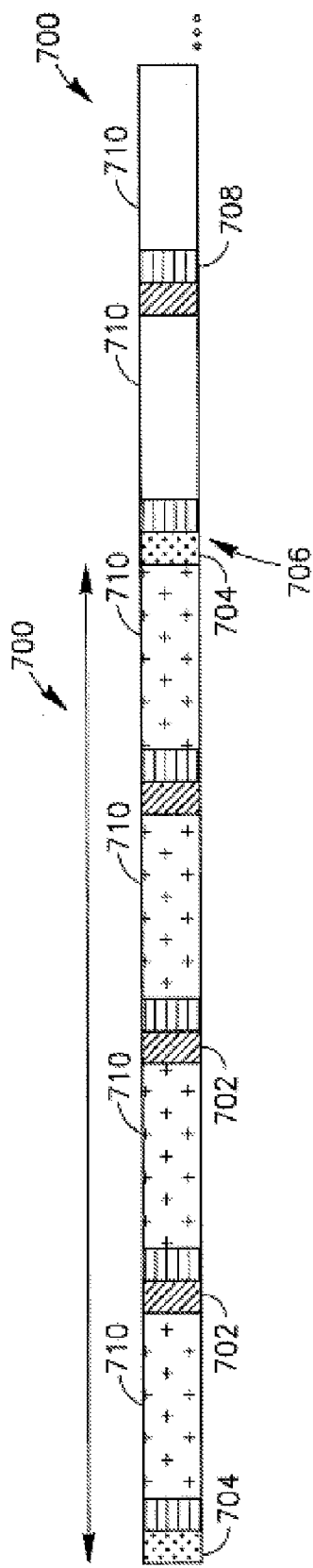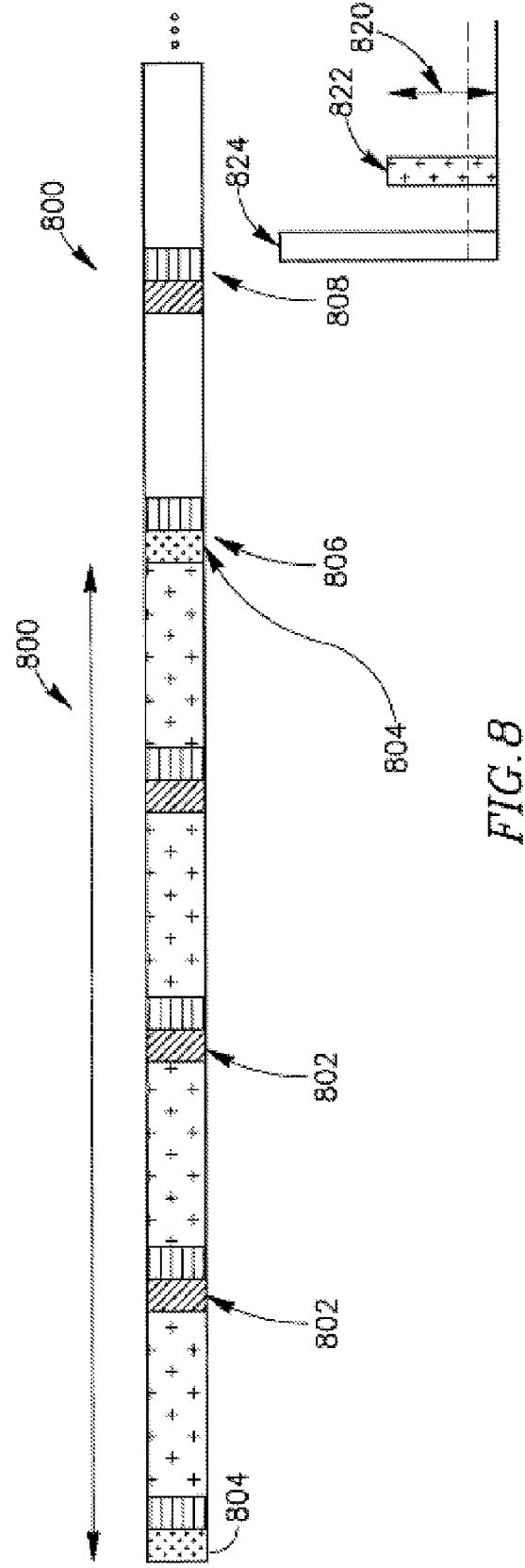
FIG. 7
FIG. 8

| The nominal channel bandwidth, BW (MHz) | 5 | 7 | 8.75 | 10 | 20 |
|---|---|---|---|---|---|
| OFDMA symbol time, $T_s$ (μs) | 114.286 | 160 | 128 | 114.286 | 114.286 |
| Number of OFDMA symbols per 5ms frame (FDD) | 43 | 31 | 39 | 43 | 43 |
| Idle time (μs) | 85.694 | 40 | 8 | 85.694 | 85.694 |
| Number of OFDMA symbols per 5ms frame (TDD) | 42 | 30 | 38 | 42 | 42 |
| TTG + RTG (μs) | 199.98 | 200 | 136 | 199.98 | 199.98 |

BASE STATION AND METHOD FOR CONFIGURING SUB-FRAMES FOR RELAY-NODE OPERATIONS

This application is a continuation of U.S. patent application Ser. No. 12/611,487, filed on Nov. 3, 2009, which is a continuation-in-part of U.S. patent application Ser. No. 11/907,808, filed Oct. 17, 2007, now U.S. Pat. No. 7,885,214, which claims the benefit of priority under 35 U.S.C. 119(e) to U.S. Provisional Patent Application Ser. No. 60/852,891, filed on Oct. 17, 2006, which are assigned to same assignee as the present application, and all of which are incorporated herein by reference in their entireties.

BACKGROUND OF THE INVENTION

In an orthogonal frequency division multiplexing (OFDMA)-based cellular radio interface, such as described in patent application Ser. No. 11/907,808, by Sassan Ahmadi and Hujun Yin, filed on Oct. 12, 2007, which is herein incorporated by reference in its entirety, propagation of radio signals in large cell sizes and/or lower frequency bands can lead to larger delay spread and consequently can cause inter-symbol interference (ISI) effects in the received signals. In the OFDM-based systems, the effects of ISI are mitigated by the cyclic prefix that is added to the beginning of the OFDM symbols. The larger the delay spread, the longer the cyclic prefix should be used to alleviate the ISI effects.

BRIEF DESCRIPTION OF THE DRAWING

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 7 is a schematic illustration of a super-frame structure having a new preamble multiplexed with a legacy preamble according to an embodiment of the present invention;

FIG. 8 is a schematic illustration of a super-frame structure having a supplemental preamble multiplexed with a legacy preamble, where the new preamble may be obscured from legacy terminals, according to an embodiment of the present invention;

Figure 1:
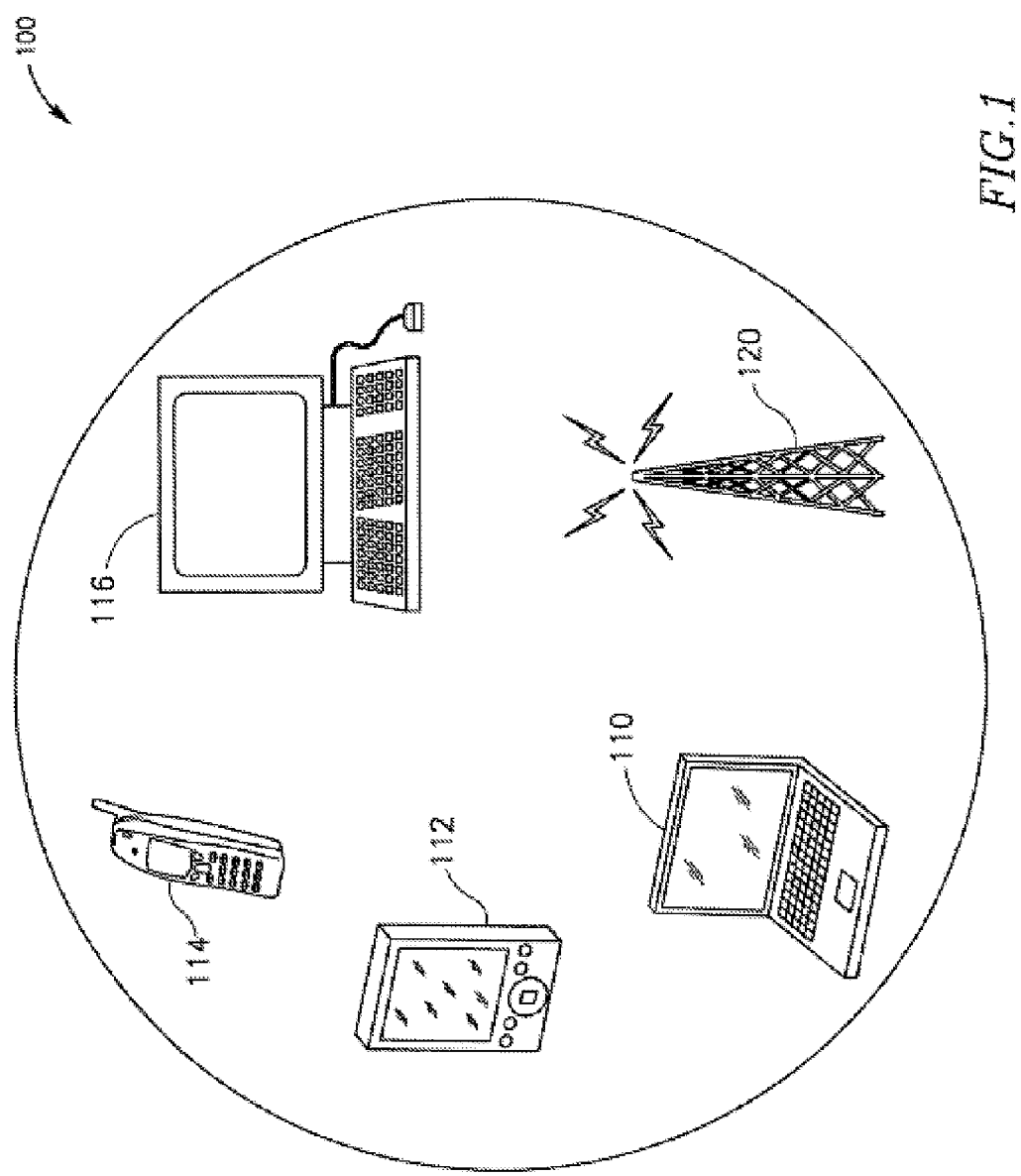
FIG. 1 is a schematic illustration of a wireless network according to an embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

While the following detailed description may describe various embodiments of the present invention in relation to wireless networks utilizing orthogonal frequency division multiplexing (OFDM) modulation, the embodiments of present invention are not limited thereto and, for example, may be implemented using other modulation and/or coding schemes where suitably applicable. Further, while example embodiments are described herein in relation to wireless metropolitan area networks (WMANs), the invention is not limited thereto and can be applied to other types of wireless networks where similar advantages may be obtained. Such networks specifically include, but are not limited to, wireless local area networks (WLANs), wireless personal area networks (WPANs), and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and cellular radiotelephones. Further, the radio systems within the scope of the invention may include cellular radiotelephone systems, satellite systems, personal communication systems (PCS), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

Reference is made to FIG. 1, which schematically illustrates a wireless network 100 according to an embodiment of the present invention. Wireless network 100 may include provider network (PN) 120, a base station (BS) 118, and one or more subscriber or other stations 110, 112, 114, and/or 116, which may be for example mobile or fixed subscriber stations. In some embodiments, base station 118, for example, in WLANs, may be referred to as an access point (AP), terminal, and/or node, and subscriber stations 110, 112, 114, and/or 116 may be referred to as a station (STA), terminal, and/or node. However, the terms base station and subscriber station are used merely as an example throughout this specification and their denotation in this respect is in no way intended to limit the inventive embodiments to any particular type of network or protocols.

Wireless network 100 may facilitate wireless access between each of subscriber stations 110, 112, 114, and/or 116 and PN 120. For example, wireless network 100 may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/Corl-2001; IEEE 802.11g™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.16-2004/Corl-2005 or IEEE Std 802.16-2009, which may herein be referred to as the "IEEE Std 802.16-2009" or "WiMAX" standards, and/or in the IEEE 802.15.1™ standards ("IEEE Standard for Local and Metropolitan Area Networks—Specific Requirements. Part 15.1: Wireless Medium Access Control (MAC) and Physical Layer (PHY) Specifications for Wireless Personal Area Networks (WPANs™)", Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a 3$^{rd}$ Generation Partnership Project (3GPP) Long Term Evolution (LTE) cellular network or any protocols for WPANs or WWANs.

Embodiments of the invention may enable the next generation of mobile WiMAX systems (e.g., based on IEEE 802.16m standard) to efficiently support substantially high mobility and low latency applications, such as, for example, Voice-over-Internet Protocol (VoIP), interactive gaming over the air-interface, deployment in larger cell-sizes or lower frequency bands, and/or "multi-hop" relay operations, while enabling backward compatible operations and integration with reference standards (e.g., the legacy mobile WiMAX systems based on IEEE Std 802.16-2009).

In some embodiments, base station 118 may manage and/or control wireless communications among subscriber stations 110, 112, 114, and/or 116 and between subscriber stations 110, 112, 114, and/or 116 and provider network 120. Subscriber stations 110, 112, 114, and/or 116 may, in turn, facilitate various service connections of other devices (not shown) to wireless network 100 via a private or public local area network (LAN), although the embodiments are not limited in this respect.

Figure 2:
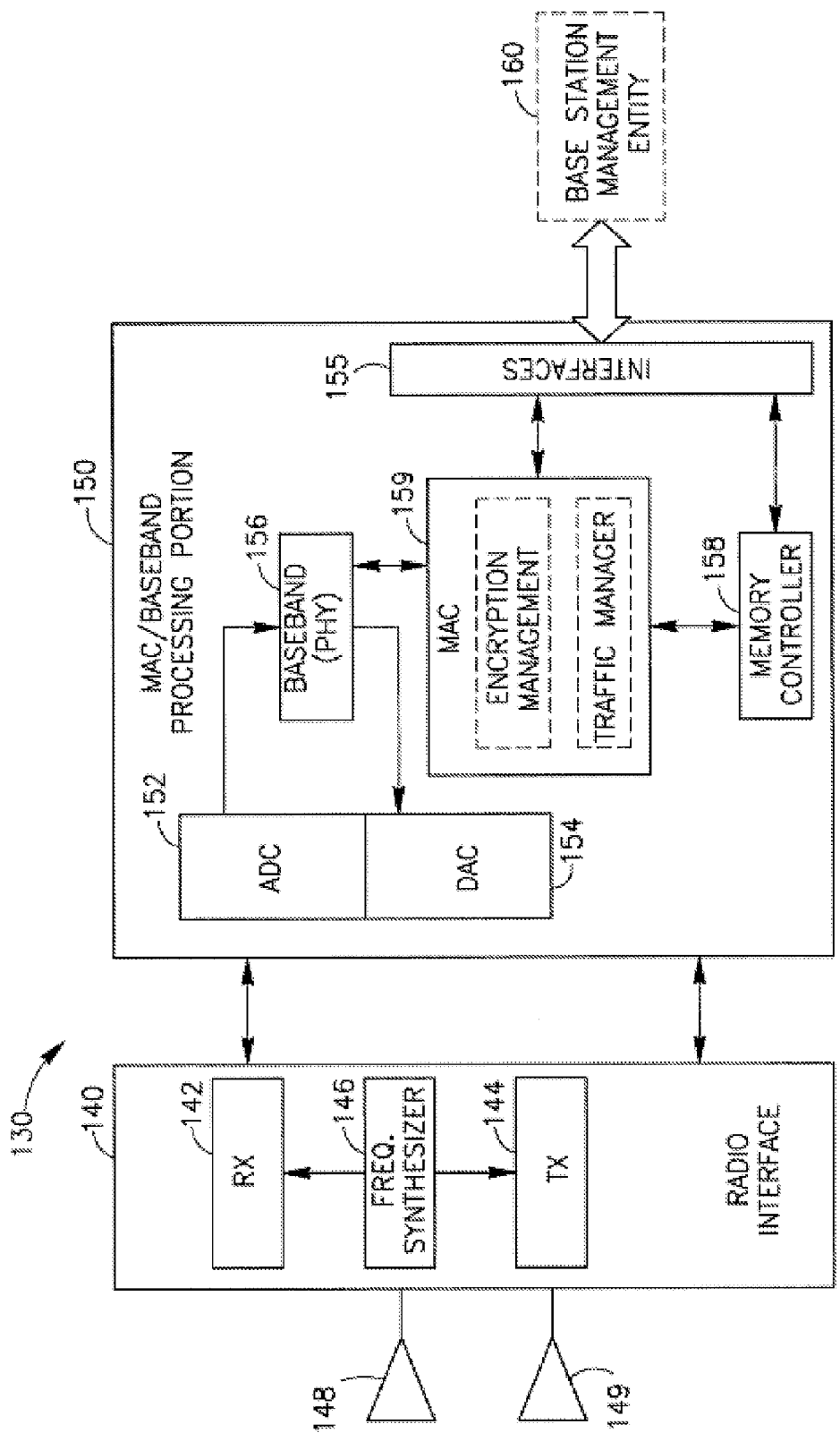
FIG. 2 is a schematic illustration of an apparatus for use in a wireless network according to an embodiment of the present invention.

Reference is made to FIG. 2, which schematically illustrates an apparatus 130 for use in a wireless network according to an embodiment of the invention. For example, apparatus 130 may be a terminal, device, or node (e.g., one of subscriber stations 110, 112, 114, and/or 116, base station 118, and/or provider network 120, described in FIG. 1) for communicating with other terminals, devices, or nodes, in a wireless network (e.g., wireless network 100, described in FIG. 1). Apparatus 130 may include a controller or processing circuit 150 including logic (e.g., including hard circuitry, processor and software, or a combination thereof) to determine the false frame detection rate and/or adjust the sensitivity of frame detection as described in one or more embodiments of the invention. In some embodiments, apparatus 130 may include a radio frequency (RF) interface 140 and/or a medium access controller (MAC)/baseband processor circuit 150.

In one embodiment, RF interface 140 may include a component or combination of components adapted for transmitting and/or receiving single carrier or multi-carrier modulated signals (e.g., including complementary code keying (CCK) and/or orthogonal frequency division multiplexing (OFDM) symbols) although the inventive embodiments are not limited to any specific over-the-air interface or modulation scheme. RF interface 140 may include, for example, a receiver 142, a transmitter 144 and/or a frequency synthesizer 146. Interface 140 may include bias controls, a crystal oscillator and/or one or more antennas 148 and/or 149. In another embodiment, RF interface 140 may use external voltage-controlled oscillators (VCOs), surface acoustic wave filters, intermediate frequency (IF) filters and/or RF filters, as desired. Due to the variety of potential RF interface designs an expansive description thereof is omitted.

Processing circuit 150 may communicate with RF interface 140 to process receive and/or transmit signals and may include, for example, an analog-to-digital converter 152 for down converting received signals, a digital-to-analog converter 154 for up converting signals for transmission. Further, processor circuit 150 may include a baseband or physical layer (PHY) processing circuit 156 for PHY link layer processing of respective receive/transmit signals. Processing circuit 150 may include, for example, a processing circuit 159 for medium access control (MAC)/data link layer processing. Processing circuit 150 may include a memory controller 158 for communicating with processing circuit 159 and/or a base station management entity 160, for example, via interfaces 155.

In some embodiments of the present invention, PHY processing circuit 156 may include a frame construction and/or detection module, in combination with additional circuitry such as a buffer memory, to construct and/or deconstruct super-frames as in the embodiments previously described. Alternatively or in addition, MAC processing circuit 159 may share processing for certain of these functions or perform these processes independent of PHY processing circuit 156. In some embodiments, MAC and PHY processing may be integrated into a single circuit if desired.

Apparatus 130 may be, for example, a base station, an access point, a subscriber station, a device, a terminal, a node, a hybrid coordinator, a wireless router, a NIC and/or network adaptor for computing devices, a mobile station or other device suitable to implement the inventive methods, protocols and/or architectures described herein. Accordingly, functions and/or specific configurations of apparatus 130 described herein, may be included or omitted in various embodiments of apparatus 130, as suitably desired. In some embodiments, apparatus 130 may be configured to be compatible with protocols and frequencies associated one or more of the IEEE 802.11, 802.15 and/or 802.16 standards for WLANs, WPANs and/or broadband wireless networks, cited herein, although the embodiments are not limited in this respect.

Embodiments of apparatus 130 may be implemented using single input single output (SISO) architectures. However, as shown in FIG. 2, certain implementations may include multiple antennas (e.g., antennas 148 and 149) for transmission and/or reception using adaptive antenna techniques for beamforming or spatial division multiple access (SDMA) and/or using multiple input multiple output (MIMO) communication techniques.

The components and features of station 130 may be implemented using any combination of discrete circuitry, application specific integrated circuits (ASICs), logic gates and/or single chip architectures. Further, the features of apparatus 130 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example apparatus 130 shown in the block diagram of FIG. 2 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Figure 3:
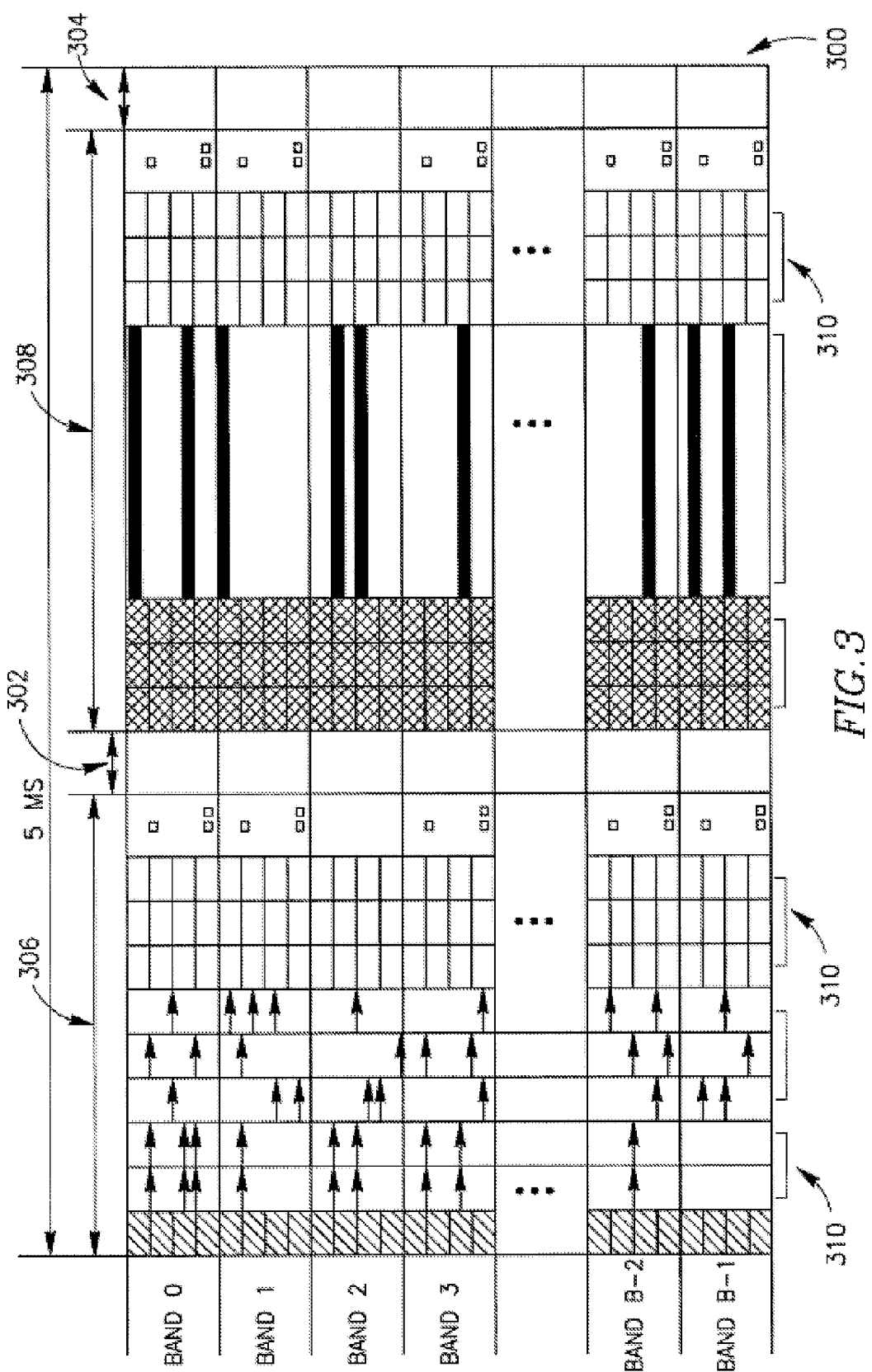
FIG. 3 is a schematic illustration of a frame structure according to an embodiment of the present invention.

Reference is made to FIG. 3, which schematically illustrates a frame 300 structure according to an embodiment of the present invention. Frame 300 (e.g., a radio frame) may be a portion of a transmitted and/or received communication in, for example, wireless network 100. In some embodiments, frame 300 may describe a periodically repeating segment structure of a larger communication signal or stream. In some embodiments, repeating frame 300 may include substantially different information, for example, during substantially each separate transmission. Frame 300 may be defined and may include broadband wireless access technology according to, for example, the IEEE Std 802.16-2009 or mobile WiMAX profiles. According to the mobile WiMAX profiles, the duration of frame 300 or transmission time interval (TTI) may be, for example, approximately 5 ms. Other frame or radio frame sizes such as for example 2, 2.5, 4, 8, 10, 12, and 20 ms may be used as for example specified in the IEEE Std 802.16-2009 specification.

In some embodiments, frame 300 may be transmitted and/or received, for example, according to a time division duplex (TDD) mode or scheme. Other time and/or frequency schemes may be used (e.g., such as a frequency division duplex (FDD) mode or scheme) according to embodiments of the invention.

Frame 300 may include an integer number of OFDM symbols or other multiplexing symbols. The number of OFDM symbols per frame may be determined, for example, according to a choice of OFDM numerology (e.g., sub-carrier spacing, cyclic prefix length, sampling frequency, etc.). In some embodiments, OFDM numerologies may be determined, set, or obtained, for example, depending on a bandwidth and sampling frequency (e.g., or an over-sampling factor according to the mobile WiMAX profiles). In various embodiments, substantially different OFDM numerologies may be used, which may result in substantially different number of OFDM symbols in frame 300.

In some embodiments, frame 300 may include idle symbols and/or idle time slots. In one embodiment, frame 300 may include one or more switching periods 302 and/or 304, for example, for changing between a pre-designated downlink (DL) transmission 306 and a pre-designated uplink (UL) transmission 308 when a TDD duplex mode or scheme is used. In other embodiments, for example, when an FDD duplex scheme is used, since DL transmissions 306 and UL transmissions 308 may be sent substantially at the same or overlapping times (e.g., over different frequencies or network channels) frame 300 may include substantially few or no idle symbols, idle time slots, and/or switching periods 302 and/or 304.

In some embodiments, the TTI or the duration of frame 300 may be, for example, approximately 5 ms. A round trip time (RTT) (e.g., the time interval between two consecutive pre-scheduled DL transmissions 306 to a specific wireless node may be, for example, approximately 10 ms. Wireless networks (e.g., wireless network 100) having rapidly changing channel conditions and/or small coherence times (e.g., rapidly moving mobile stations or nodes, such as automobiles having vehicular speeds of, for example, in the excess of approximately 120 kilometers per hour (km/h)) may use mechanisms for supporting substantially high mobility in varying channel conditions. Embodiments of the invention may support wireless network 100 having substantially small round trip times, for example, to enable substantially fast-varying channel condition feedback between subscriber stations 110, 112, 114, and/or 116, such as a mobile station, and base station 118. Other time durations may be used.

The current IEEE Std 802.16-2009 specification standard frame structure may include restrictions, such as substantially long TTIs that are typically not suitable for supporting substantially fast feedback and low access latency (e.g., less than 10 ms), which may be used by, for example, emerging radio access technologies.

Embodiments of the present invention may include or use a modified version of the frame 300 structure for supporting lower latency operations, while maintaining backward compatibility, for example, to the IEEE Std 802.16-2009 specification frame structure. Frame 300 structure may be used, for example, in the next generation of mobile WiMAX systems and devices (e.g., including the IEEE 802.16m standard). In some embodiments, frame 300 structure or portions thereof may be transparent to the legacy terminals (e.g., which operate according to mobile WiMAX profiles and IEEE Std 802.16-2009) and may be used only for communication between BSs, subscriber stations, and/or MSs that both operate based on the IEEE 802.16m standard.

According to embodiments of the invention, wireless network 100 and components thereof, which may communicate using the new frame structure (e.g., described according to FIGS. 3-15), may be backward compatible with a reference network, which may communicate using a legacy frame structure (e.g., described according to the mobile WiMAX profiles and based on the IEEE Std 802.16-2009). In some embodiments, backward compatibility may include for example, that a legacy terminal (e.g., which may communicate using legacy and/or reference frame structures) may operate in a wireless network with no significant impact on the performance and operation of the terminal relative to a legacy network. In some embodiments, a new (e.g., a non-legacy) terminal or subscriber station using the new (e.g., a non-legacy) frame structure may operate in a legacy network with no significant impact on the performance and operation of the terminal relative to the wireless network. For example, the new terminal may be "backward compatible". In some embodiments, wireless network 100 may support both legacy and new (e.g., a non-legacy) terminals, for example, at substantially the same time (e.g., where time division multiplexing of the new and legacy frames overlap in the same frame). In some embodiments, wireless network 100 may enable seamless communication, mobility, and handoff between legacy terminals and new terminals. When used herein, "new", "evolved" or "updated," and "next generation" are merely relative to "old", "legacy" or "current", etc. For example, a "new" standard may be a standard that is in use as of the date of the filing of this application, and a "legacy" system may be one that is in use both prior to the date of filing this application and for some time after the filing of this application; a "new" system is one implemented or developed after a "legacy" system, typically including improvements and updates. "New", "evolved", "updated", etc. systems are often backward compatible such that they are usable with "old", "legacy" or prior systems or standards.

According to embodiments of the invention, the new frame structure may include new synchronization and broadcast channels to extend the capabilities of the IEEE Std 802.16-2009 by, for example, enhancing system acquisition and/or enhancing cell selection at low signal to interference+noise ratios (SINR). According to the IEEE Std 802.16-2009 a broadcast channel (e.g., and a DL channel descriptor and UL channel descriptor) are typically not located at a pre-defined location in a frame, the mobile stations have to decode the common control channel (e.g., MAP) for acquiring system configuration information.

According to an embodiment of the present invention, the new frame structure may include for example a super-frame that includes an integer number of radio frames, which may include synchronization and/or broadcast information and/or messages, such as, system configuration information, which may simplify wireless network 100 operations and further reduce the overhead and acquisition latency of wireless network 100.

Figure 4:
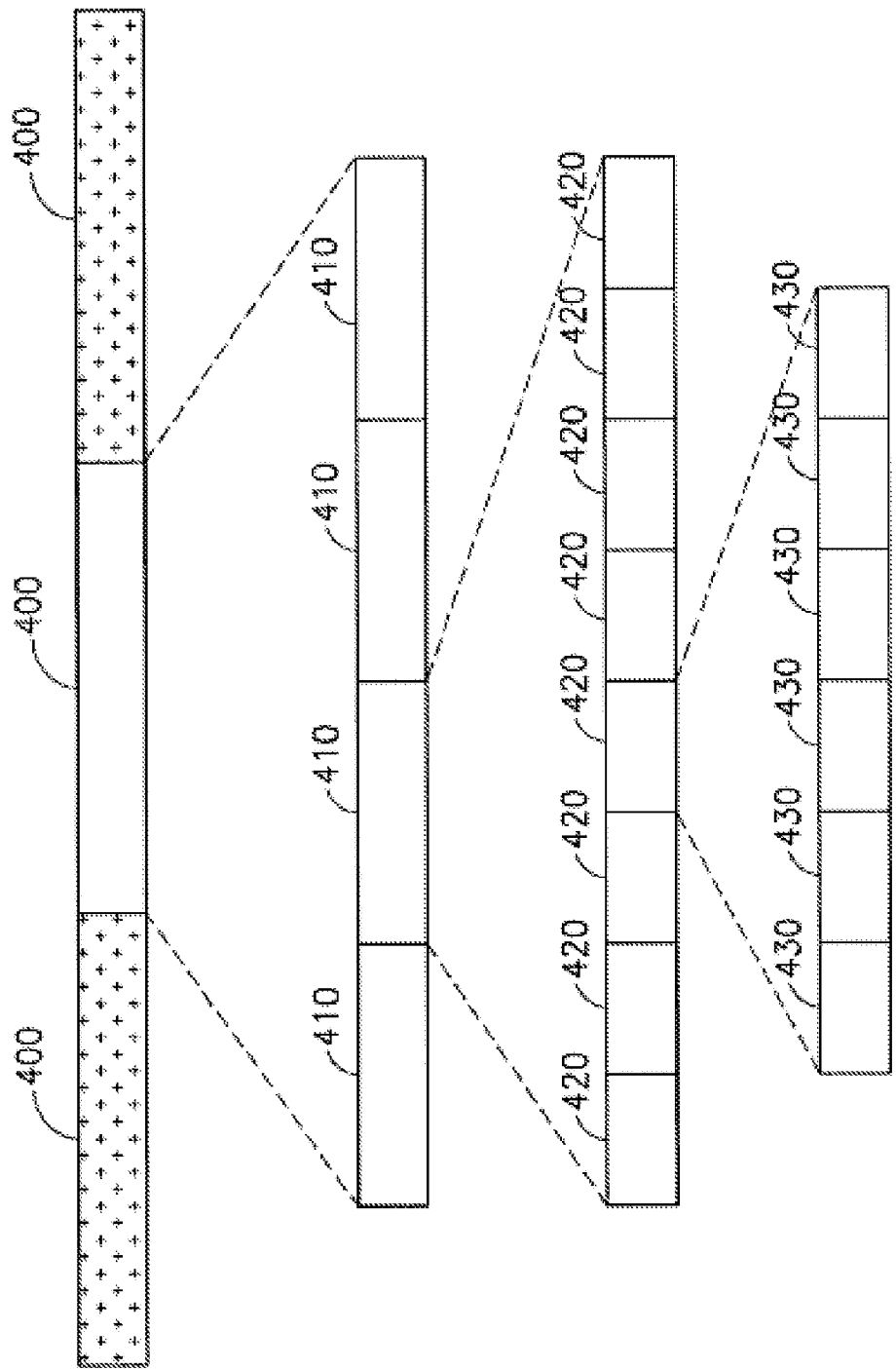
FIG. 4 is a schematic illustration of a super-frame structure according to an embodiment of the present invention.

Reference is made to FIG. 4, which schematically illustrates a super-frame 400 structure according to an embodiment of the present invention. In some embodiments, a transmission between terminals or nodes may include, for example, one or more super-frames 400. Super-frame 400 may include or be partitioned into a fixed and/or predetermined number of frames 410. In other embodiments, the number of frames 410 in each of two or more of super-frames 400 may be different. The number of frames, M, 410 within a super-frame 400 (e.g., M, may be an integer, where M= 2, 3, 4 . . . ) may be a design parameter and may be specified in a standard specification and, for example, may be fixed for a particular profile and deployment. In some embodiments, the number of frames 410 within super-frame 400 may be determined by one or more factors, including but not limited to, for example, target system acquisition time, a maximum permissible distance between two consecutive preambles (e.g., synchronization channels), the minimum number of preambles that may be averaged during system acquisition for the detection of the preamble, and/or a maximum permissible distance between two consecutive broadcast channels (e.g., system configuration information or paging channels).

In one embodiment, substantially each super-frame 400 may be partitioned into or include two or more (e.g., four (4)) frames 410. Other numbers of partitions, divisions, or frames may be used. The length of each frame 410 may be for example approximately 5 ms, for example, for establishing backward compatibility with systems compliant with IEEE Std 802.16-2009. Other frame or radio frame lengths may be used. Each of frames 410 may be further partitioned or subdivided into two or more (e.g., eight (8)) sub-frames 420. Other numbers of divisions may be used. The length of sub-frame 420 may determine the TTI for terminals that may be compliant with the new standard and, for example, incorporate super-frame 400 and/or frame 410 structures. The beginning and end of each of the TTIs may be substantially aligned or synchronized with, for example, a sub-frame boundary. Each TTI may contain an integer number of sub-frames (e.g. typically one or two sub-frames). Each sub-frame 420 may be partitioned into or include a fixed number of OFDM symbols 430. In one embodiment, each sub-frame 420 may be partitioned into or include, for example, six (6) OFDM symbols, so that the number of OFDM symbols 430 within a sub-frame (e.g., the length of sub-frame 420) may be compatible to resource block sizes (e.g., sub-channels) corresponding to various permutation schemes, for example, specified in the IEEE Std 802.16-2009.

In other embodiments, there may be other or alternative numbers, lengths, sizes, and/or variations, of super-frames 400, frames 410, sub-frames 420, and/or OFDM symbols 430. The numbers used herein are presented for demonstrative purposes only. In another embodiment, the length of frames 410 (e.g., approximately 5 ms) and the number of OFDM symbols 430 (e.g., six (6)), may be set for establishing backward compatibility with IEEE Std 802.16-2009 compliant systems, devices, and/or transmissions.

Permutation schemes, for example, defined according to current standard specifications, may include a number, for example, from one to six, slots for transmitting signals and/or resource blocks. The boundary of physical a resource block may, for example, be aligned with a sub-frame boundary. In some embodiments, each physical resource block may be substantially contained within a single sub-frame 420. In other embodiments, each physical resource block may be substantially contained within two consecutive sub-frames.

It may be appreciated by those skilled in the art that embodiments of the invention, for example, including, super-frame 400 structures, may be applied using either of the TDD and FDD duplexing schemes or modes. In the FDD duplex mode, each of the DL and UL transmissions may be communicated, for example, concurrently, on respective frequencies or channels. In the TDD duplex mode, each of the DL and UL transmissions may be communicated, for example, at substantially non-overlapping intervals (e.g., according to time division multiplexing (TDM) scheme) over substantially the same frequency or channel. In the TDD duplex mode of operation and within any frame 410, sub-frames 420 may be configured to DL and UL transmissions (e.g., DL transmission 306 and UL transmission 308) for example statically in each deployment. The DL and UL transmissions may be separated by idle times and/or idle symbols for switching between DL and UL transmissions (e.g., during switching periods 302 and/or 304).

In one embodiment of the invention, "legacy zones" and "new zones" may include periods, portions or zones, for example, of DL or UL transmission, specifically designed to substantially only communicate with legacy terminals or new terminals, respectively. In the TDD duplex mode of the IEEE Std 802.16-2009, each of DL transmission 306 and UL transmission 308 may be further partitioned into two or more permutation zones. In some embodiments, the number of contiguous OFDM or other symbols 430 in a frame 410, may be referred to as, for example, a permutation zone (e.g., permutation zone 310, described in reference to FIG. 3). The permutation zone may, for example, include a number of contiguous OFDM symbols (e.g., in DL and UL transmissions 306 and 308, described in reference to FIG. 3) that use substantially the same permutation (e.g., partially used sub-channel (PUSC) to distributed allocation of sub-carriers, Adaptive Modulation and Coding (AMC) for localized allocation of sub-carriers, etc.).

According to an embodiment of the invention, a frame may include or may be partitioned into legacy zones and new zones (other terms may be used). In one embodiment, legacy terminals and new terminals may communicate using legacy zones and new zones, respectively. In some embodiments, new terminals may communicate using both legacy zones and new zones. Legacy terminals typically only communicate using legacy zones. In one embodiment, in the frame, each of DL transmissions may be further partitioned into two or more zones, for example, including a DL transmission legacy zones and a DL transmission new (e.g., non-legacy) zones and each of UL transmissions may be further partitioned into two or more zones, for example, including UL transmission legacy zones and UL transmission new (e.g., non-legacy) zones.

Embodiments of the invention may provide a partitioning of frames into sub-frames (e.g., where the boundaries of transmission blocks or zones may be synchronized with the sub-frame boundaries). According to the IEEE Std 802.16-2009, the boundaries of transmission blocks or zones may start and end at any OFDM symbol within the boundary of a frame. According to embodiments of the invention, the new zones may use a new and more efficient resource allocation and feedback mechanism. The total number of OFDM symbols within a frame may vary depending on the OFDM numerology. In order to maintain backward compatibility with the legacy mobile WiMAX systems, the same frame size and OFDMA numerology (e.g., or OFDMA parameters) may be used for the IEEE 802.16m systems and the legacy mobile WiMAX systems. It may be appreciated by those skilled in the art that all permissible numerologies and/or frame sizes, for example, specified by the 802.16e-2005 standard, may be used in accordance with embodiments of the present invention.

Embodiments of the invention may provide super-frame structures that may be compatible with legacy standards, such as, the IEEE Std 802.16-2009 and/or other standards. For example, the super-frame structure may include or may be compatible with a subset of features, for example, as specified in the mobile WiMAX profile (e.g., and may be backwards compatible with the mobile WiMAX profile).

Embodiments of the invention may provide a super-frame structure, which may be partitioned into a number of frames that include, for example, one or more, legacy synchronization channel (e.g., a IEEE Std 802.16-2009 preamble), new synchronization channels (e.g., a IEEE 802.16m preamble), broadcast channel (BCH), medium access protocol (MAPs) or common control channel (CCCH) in the new and legacy zones corresponding to each frame or an integer number of frames.

Figure 5:
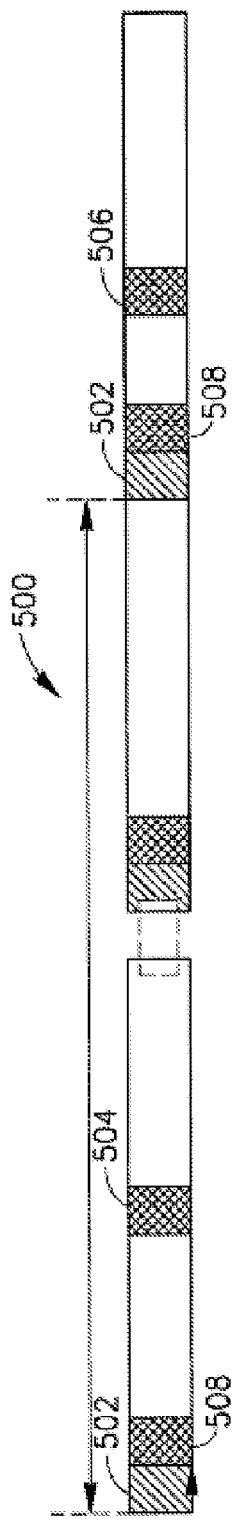
FIG. 5 is a schematic illustration of a super-frame structure according to an embodiment of the present invention.

Reference is made to FIG. 5, which schematically illustrates a super-frame 500 structure according to an embodiment of the present invention. In one embodiment, super-frame 500 may include a legacy preamble 502, for example, which may be referred to as primary synchronization channel (PSCH). In some embodiments, super-frame 500 may include an additional or supplemental preamble 504, for example, for improving system timing acquisition and cell selection for new terminals. Supplemental preamble 504 may, for example, be referred to as secondary synchronization channel (SSCH). The synchronization channels may include sequences, which may be used and/or deciphered by both base stations and mobile stations, for example, for acquiring frame timing and/or scheduling.

In some embodiments, new preamble 504 may be effectively or partially transparent, unreadable, or undetectable to legacy terminals, while legacy preamble 502 may be detectable to both legacy and new terminals. In some embodiments, super-frame 500 may include a broadcast channel (BCH) 506. The broadcast channel may contain information that may for example include system configuration information, paging, and/or other broadcast type information, and may be sent by a base station to all mobile stations in the network and/or surrounding area.

Figure 9:
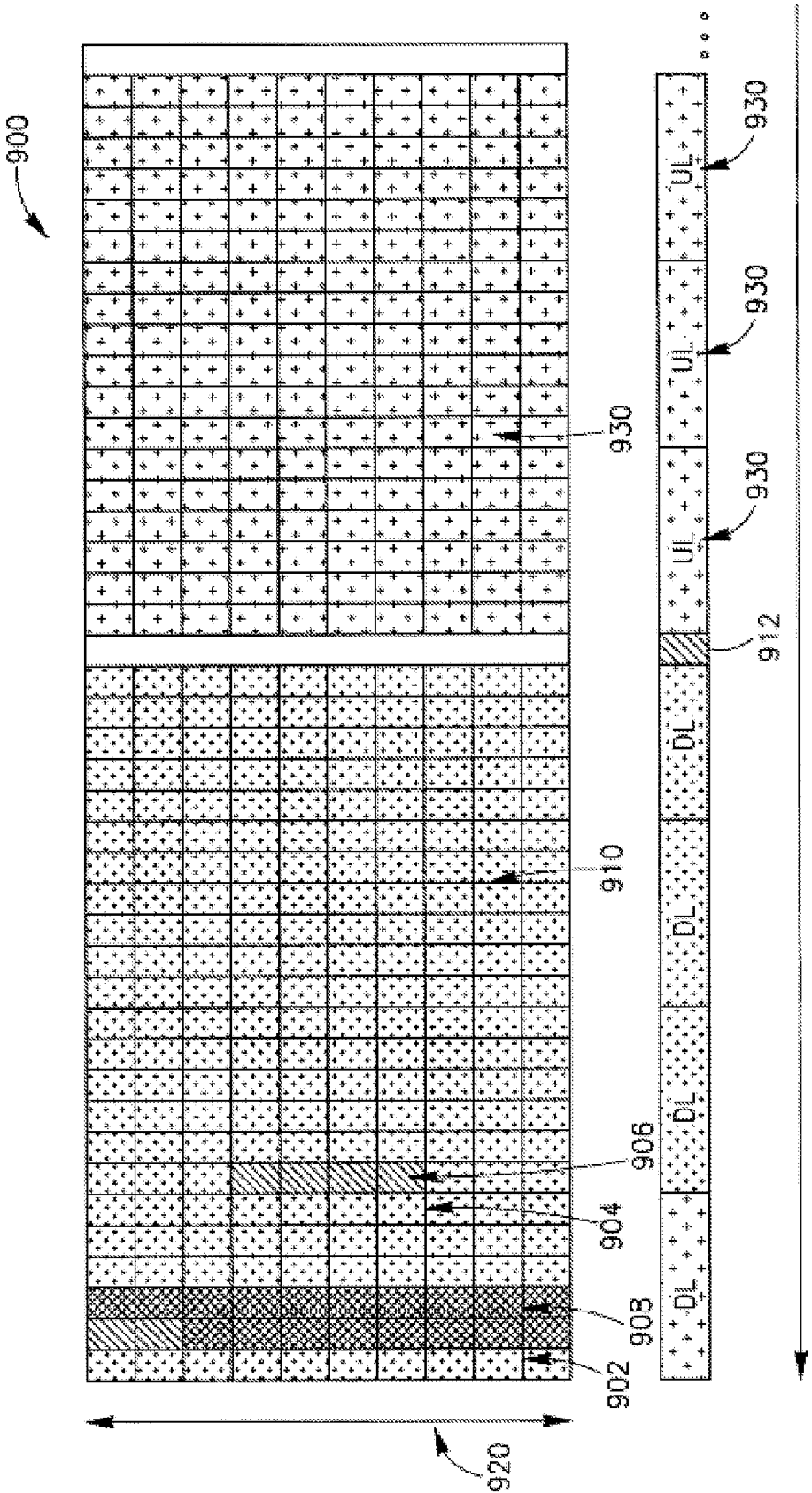
FIG. 9 is a schematic illustration of a frame structure partitioned in the time and/or frequency domain according to an embodiment of the present invention.

As shown in FIG. 5, supplementary or new preamble 504 (e.g., SSCH) may be located at a fixed position in new or legacy zones. In one embodiment of the present invention, for example, the new preamble 504 may be positioned at a fixed offset, which may be referred to as, for example, "SSCH_OFFSET". The SSCH_OFFSET may be a measure of a location of the new preamble 504, for example, relative to the location of the legacy preamble, for example, in every frame. In some embodiments, the legacy preamble in mobile WiMAX systems may be located in the first OFDM symbol of every frame (as shown in FIG. 9). The value of SSCH_OFFSET may be included and broadcasted as part of the system configuration information. In some embodiments, when new preamble 504 is detected by a mobile terminal, the SSCH_OFFSET may be used to locate the beginning of a frame. In one embodiment, when SSCH_OFFSET=0, there may be no legacy preamble 502, which may indicate that the network does not support legacy terminals. In some embodiments, a new synchronization channel and the broadcast channel may span a minimum system bandwidth (BW). In some embodiments, the legacy synchronization channel typically spans the entire system BW, an example of which is shown in FIG. 9. The region pre-designated for communicating new preamble 504 (e.g., via multiple sub-carriers) may be, for example, transparent and/or ignored by legacy terminals. A scheduler for downlink base station or terminal transmissions typically does not allocate user/system traffic/control/signaling in the region pre-designated for communicating new preamble 504.

Figure 6:
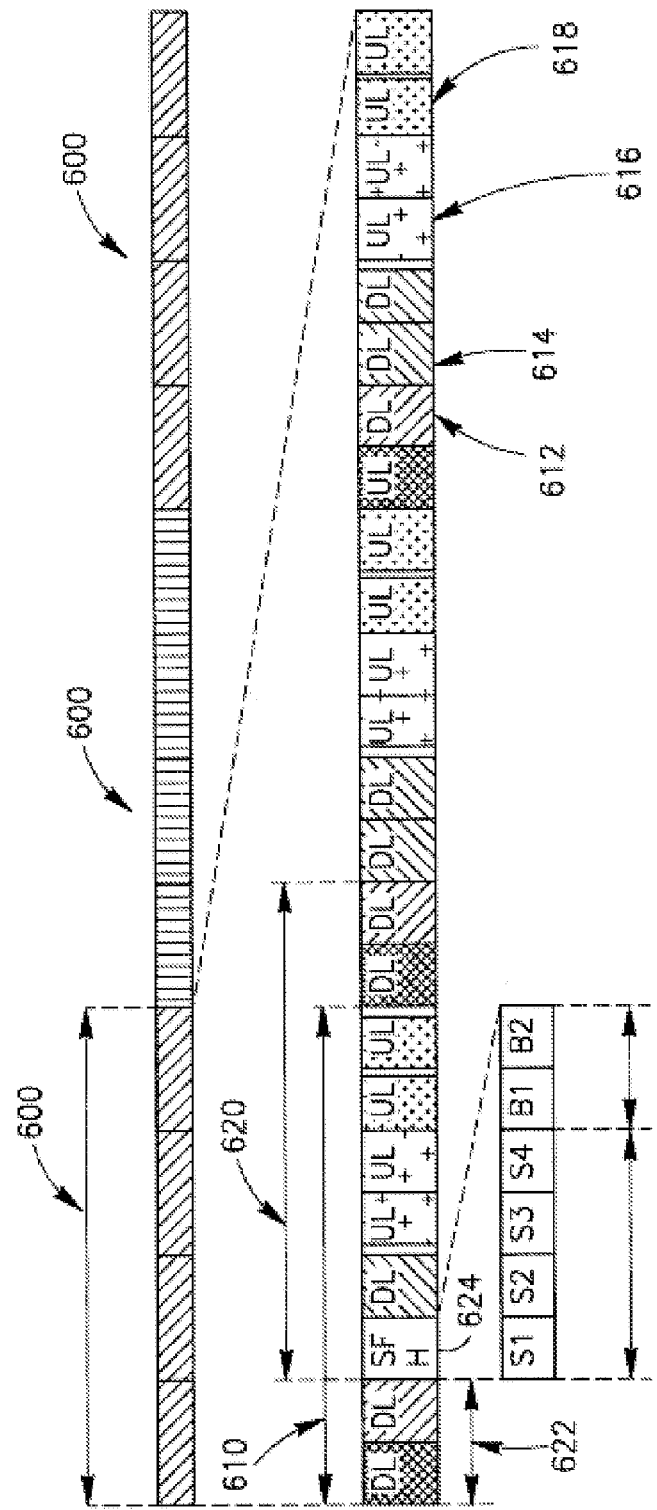
FIGS. 6, 6A, and 6B are schematic illustrations of super-frame structure according to an embodiment of the present invention.
Figure 6A:
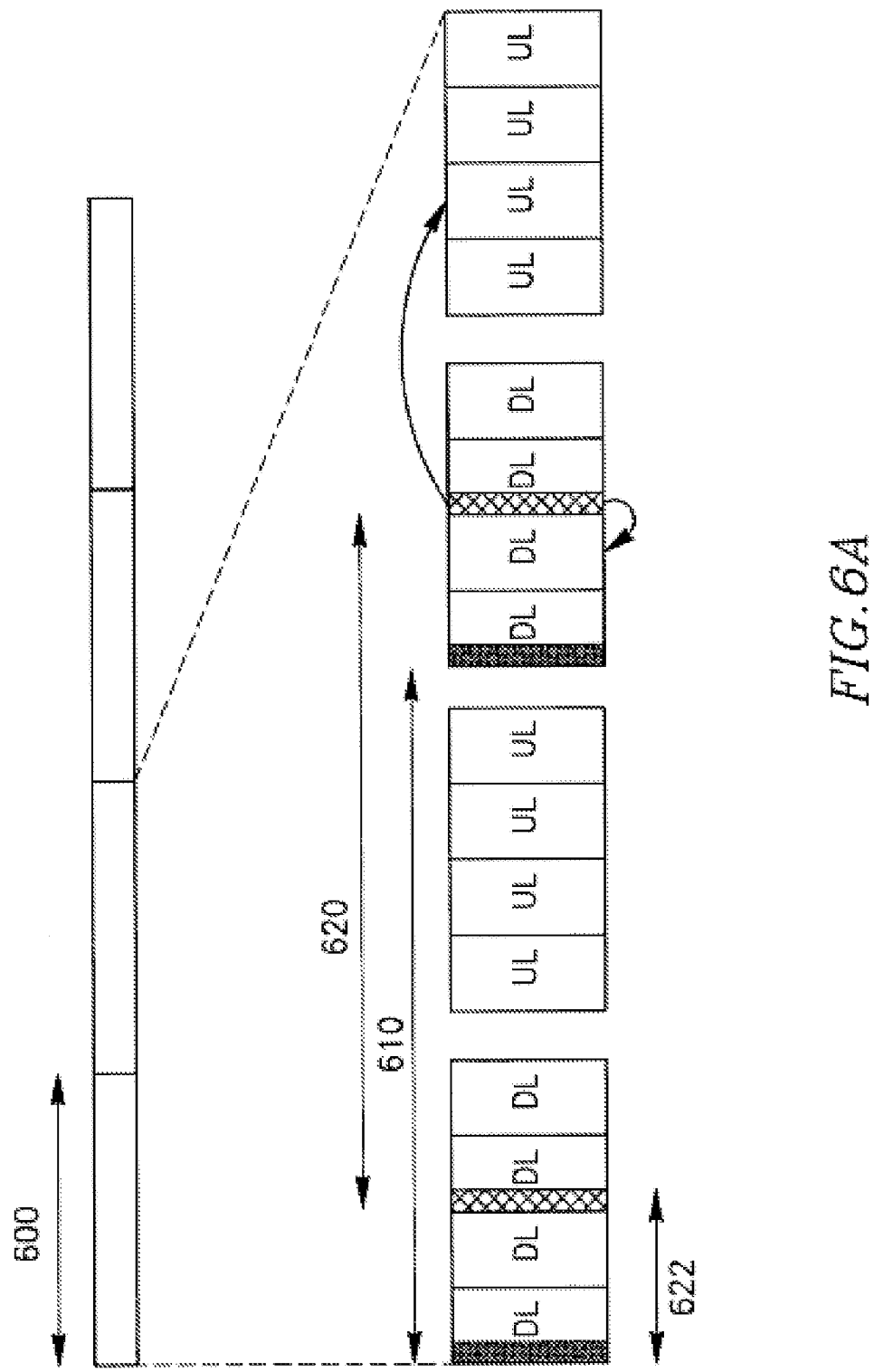
Figure 6B:
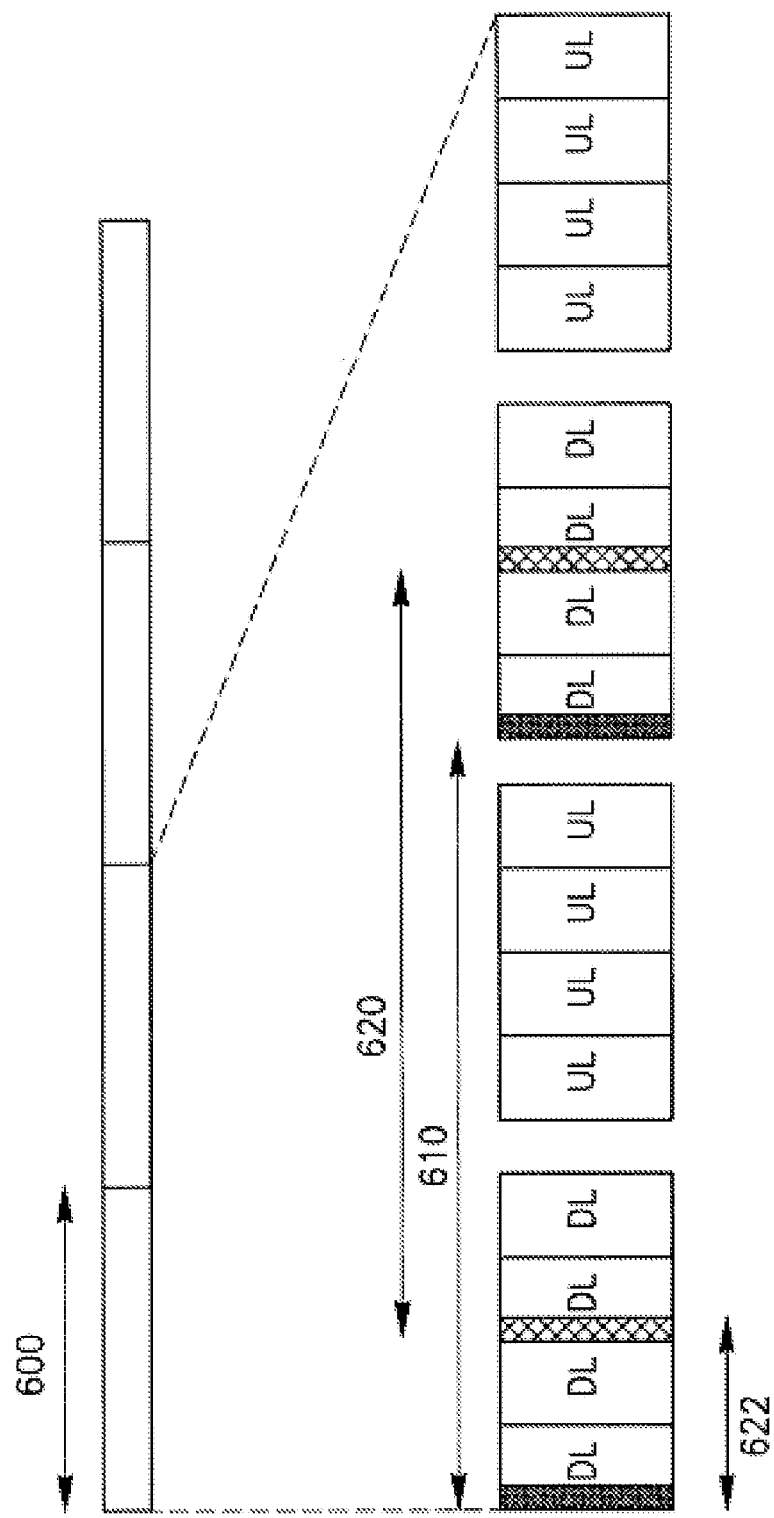

In another embodiment of the present invention, for example, new preamble 504 may be located, for example, in the beginning of the new frame where the new frame may be located at a fixed offset relative to the legacy frame. In one embodiment, the fixed offset may be referred to as, for example, "FRAME_OFFSET", and may be fixed within the frame timing. In some embodiments, the value of the FRAME_OFFSET may be set by a network operator or administrator (e.g., and not broadcast). The new mobile terminals may detect new preamble 504, which may indicate the beginning of the new frame and, for example, other information channels relative to the beginning of the new frame (e.g., as shown in FIG. 6). For example, the timing or periodicity of BCH 506 may be substantially aligned with the timing or periodicity of super-frame 500 transmissions.

In various embodiments, super-frame 500 may have substantially different structures, which may be distinguished, for example, based on the relative position of legacy preamble 502 and/or new preamble 504 in super-frame 500, and/or other features or design considerations for the frame structure (e.g., such as a DL scan latency, physical layer overhead, and other information). It may be appreciated to those skilled in the art that although three options for the structure of super-frame 500, including for example, options I, II, and III, may be described, various other structures and/or variations thereof may be used in accordance with embodiments of the present invention.

The description that follows may include embodiments that may individually or collectively be referred to as Option I. Option I, and other "Options" presented herein are examples only, and are non-limiting.

In some embodiments, new preamble 504 and/or BCH 506 may be positioned substantially at the beginning of each super-frame 500, for example, in the first frame of each super-frame 500 in a communication stream. In such embodiments, legacy preamble 502 and new preamble 504 may be separately positioned (e.g., spaced or offset along the length of super-frame 500). In such embodiments, the impact or visibility of new preamble 504 to legacy terminals (e.g., which typically only detect legacy preamble 502) and operations thereof, such as, system acquisition, may be minimized. New preamble 504 may be periodically repeated at any desirable frequency, for example, substantially every frame. BCH 506 may contain system-configuration information, paging channels, and/or other broadcast information. In some embodiments, BCH 506 may be synchronized with super-frame 500 intervals and may appear every integer number of super-frames. In some embodiments, new terminals may use new preamble 504 (e.g., exclusively or additionally) to improve system timing acquisition and fast cell selection. For example, new preamble 504 may include cell identification (ID) information or codes and may be used for acquisition of frame timing by new terminals. For example, a cell ID code may include a concatenated base station group ID code, base station ID code, a sector ID code, and/or other codes or information, for example, to simplify the detection (e.g., execute a structured search) of the cell ID.

According to embodiments of the invention described in reference to Option I, since new preamble 504 may be spaced from legacy preamble 502, new preamble 504 may be minimally detectable by legacy terminals. In some embodiments, in order to minimize the physical layer overhead (layer 1 overhead), for example, which may be increased by using an OFDM symbol for transmitting new preamble 504, new preamble 504 may be transmitted, for example, over a limited (e.g., minimal) bandwidth or time, or by using additional sub-carriers corresponding to the same OFDM symbol for scheduling user traffic, for example, as shown in FIG. 9.

The description that follows may include embodiments that may individually or collectively be referred to as Option II.

Reference is made to FIG. 6, which schematically illustrates a super-frame 600 structure according to an embodiment of the invention. In some embodiments for TDD duplex mode, super-frame 600 may be partitioned into, for example, four frames with pre-designated legacy periods, intervals or zones and new or non-legacy periods, intervals or zones. In one embodiment, legacy frame 610 may be further partitioned into sub-frames, including, for example, DL transmission legacy zones 612 and UL transmission legacy zones 616. The new frame 620 may begin at a fixed offset (e.g., FRAME_OFFSET) relative to the beginning of the legacy frame. The value of the FRAME_OFFSET may be an integer number of sub-frames and may be determined based on the ratio of the lengths or time of the DL to UL transmissions (e.g., in TDD duplex mode). For example, when FRAME_OFFSET=$T_{offset}$ and $T_{sub-frame}$ denotes the length of the sub-frame and $T_f$ denotes the frame length the value of the minimum and maximum permissible values for $T_{offset}$ may be determined as follows:

$T_{offset} < \alpha T_f$ $0 \le \alpha \le 1$: the fraction of frame allocated to DL
Example: $\alpha=0.625$ for DL:UL=5:3

$nT_{sub-frame} \le \alpha T_f - T_{offset}$ $1 \le n < 7$ $T_{offset} = mT_{sub-frame}$ $0 \le m <$ (Number of DL Sub_Frames)$-n$ In some embodiments, legacy terminals may communicate using legacy frames 610 and new terminals may communicate using new frames 620 and/or legacy frames 610.

According to embodiments of the invention, for example, in option III, the beginning of new frames 620 and legacy frames 610 may be offset by a fixed value, for example, by a frame offset 622 or an offset interval (e.g., a fixed duration of time and/or number of sub-frames).

The relative positions of new frames 620 and legacy frames 610 according to one embodiment are depicted in FIG. 6, for example, in TDD duplex mode. For example, in TDD duplex mode, legacy frame 610 structure may start with a DL transmission 612 and end with an UL transmission 616. For example, new frame 610 structure may start with a DL transmission 614, followed by a UL transmission 618, and end with a DL transmission 614.

In some embodiments, each new frame 610 may contain a new preamble (e.g., SSCH), for example, in a sub-frame at the start or beginning of frame 610.

In other embodiments, each super-frame 600 may include a super-frame header (SFH) 624, for example, in a sub-frame at the start or beginning of super-frame 600. For example, SFH 624 may include a new preamble and a broadcast channel.

For example, K and 6-K, K=1, 2, . . . , 6 may denote the number of OFDM symbols that are allocated to new preamble and broadcast channel, respectively. The number of OFDM symbols allocated to the new and legacy preambles may be as small as one OFDM symbol per channel. In one embodiment, the remainder of the OFDM symbols available in the SFH 624 sub-frame may be allocated, for example, for user traffic, control, and/or control and signaling information, which may minimize the system layer1 overhead.

SFH 624 may include a new preamble sequence and the broadcast information (e.g., including system configuration information and a paging channel). In some embodiments, legacy frames and new frames may have a fixed frame offset 622, which may be configurable by the network operator.

In some embodiments of the present invention, the legacy zone and new zone may be offset by a fixed number of sub-frames. The offset value may be substantially stable or fixed within a practical deployment. Due to the dynamic nature of network traffic in practice, in some frames, the legacy zone may be under-utilized while the new zone may be fully loaded or vice versa. In some embodiments, a pointer in a IEEE 802.16m common control channel may be designed and/or used, for example, to point to or indicate a sub-frame in the legacy zone that may be unused by legacy terminals. For example, when legacy zone and/or new zone partitions are fixed, the resources (e.g., sub-frames) may be dynamically allocated from frame to frame maximize the use of physical resources, which may otherwise be unused.

The description that follows may include embodiments that may individually or collectively be referred to as Option III.

Reference is made to FIG. 7, which schematically illustrates a super-frame 700 structure having a new preamble 704 multiplexed with a legacy preamble 702, according to an embodiment of the present invention. In some embodiments, a new preamble 704 may be multiplexed with a legacy preamble 702, for example, every M frames (e.g., where M may be the number of frames within a super-frame 700). For example, the first OFDM symbol of the first frame 710 in super-frame 700 may include new preamble 704 and the M−1 succeeding frames 710 in super-frame 700 may include legacy preamble 702. In some embodiments, a common control channel (e.g., including DL and UL MAPs) and/or frame control header (FCH) 708 and a BCH 706 transmission may occur, for example, at super-frame 700 and frame 710 intervals, respectively.

The acquisition of legacy preamble 702 (e.g., by legacy terminals) may break as a result of interruption in the reception of the periodic legacy preamble 702. Since new preamble 704 and legacy preamble 702 may share physical resources, for example, and may be transmitted at substantially the same or overlapping times or locations along super-frame 700, there may typically be no additional physical resource needed for including the new preamble 704 into a super-frame 700 structure. Additionally, in some embodiments, the position of new preamble 704 may be fixed within a periodic number (one or more) of frames 710.

In some embodiments, when new preamble 704 and legacy preamble 702 are code division multiplexed, for example, in substantially the same OFDM symbol, there is typically no substantial impact on the layer 1 overhead. In such embodiments, some legacy preambles 702 may be transmitted in succession and, for example, other legacy preambles 702 may be superimposed with new preamble 704 (e.g., according to multiplexing scheme discussed herein).

In some embodiments, new preamble 704 may be multiplexed with legacy preamble 702 using, for example, a code division multiplexing (CDM) scheme. A CDM scheme may include code division multiplexing new preamble 704 and legacy preamble 702, for example, substantially every M frames 710, for example, as shown in FIG. 7.

In one embodiment, new preamble 704 and legacy preamble 702 sequences may be superimposed and transmitted (e.g., by a new base station or terminal) every M frames, for example, according to the following equation: $Y_k = u_k + X_k u'_k$ where $u_k$, $u'_k$, $X_k$ may denote the $k^{th}$ primary synchronization sequence, the $k^{th}$ new synchronization sequence, and the $k^{th}$ spreading function. Other (e.g., linear) combinations may be used.

For example, the spreading function may include a set of robust spreading functions, which may substantially cover the new synchronization sequences. Other multiplexing schemes or combinations thereof may be used.

In one embodiment, legacy preamble 702 and new preamble 704 may be, for example, code division multiplexed every fixed number (e.g., M=1, 2, 3 . . . ) frames. In such embodiments, legacy terminals may experience or include a small degradation in the energy of the legacy preamble every M frames. The new terminals may detect and extract new preamble 704 that may encroach or may be superimposed on legacy preamble 702. As presented herein, new preamble may be referred to, for example, as "new preamble", "new preamble", "new synchronization channel", "SSCH" and "secondary synchronization channel", a new system, profile, and/or standard, may be referred to, for example, as an "evolved version" of the reference system standard.

Reference is made to FIG. 8, which schematically illustrates a super-frame 800 structure having a new preamble 804 multiplexed with a legacy preamble 802, where legacy preamble 802 may be obscured from legacy terminals, according to an embodiment of the present invention.

In some embodiments, the superposition of new preamble 804 on the legacy preamble 802 may, for example, increase interference levels or, for example, an interference over thermal 820 (IoT) value. The objective is to find the minimum Signal to Interference+Noise Ratio (SINR) that is required for proper detection of the legacy preamble or alternatively the maximum IoT that can be tolerated by the legacy terminals (this leads to the maximum power that can be used for the new preamble).

In one embodiment of the present invention, a signal received at the $s^{th}$ sub-carrier, $y_s$, may be calculated, for example, as shown in the equations that follow. In one embodiment, new preamble 804 associated with each new base station or relay station may be substantially different, for example, for enabling a mobile station to distinguish, detect, and/or select, different base stations or relay stations in a network. In some embodiments, since the received power 822 of new preamble 804 may be determined, or be directly proportional to, the IoT 820, it may be desirable for the IoT 820 to be maximized, for example, to the extent that the minimum SINR level would allow the legacy terminals to correctly detect legacy preambles 802. In some embodiments, an optimization of the IoT 820 value may be performed, for example, according to the equations that follow:

$$y_s = H_{s,k} u_k + H_{s,k} \chi_k u'_k + w_s + \sum_{i \neq k} H_{s,i} u_i + \sum_{l \neq k} H_{s,l} \chi_l u'_l$$

$$SINR_s = 20 \log_{10} \frac{|H_{s,k} u_k|}{|H_{s,k} \chi_k u'_k + w_s + \sum_{i \neq k} H_{s,i} u_i + \sum_{l \neq k} H_{s,l} \chi_l u'_l|}$$

$$SINR_s \geq 10 \log_{10} \frac{|H_{s,k} u_k|^2}{|H_{s,k} \chi_k u'_k|^2 + |w_s|^2 + \left|\sum_{i \neq k} H_{s,i} u_i\right|^2 + \left|\sum_{l \neq k} H_{s,l} \chi_l u'_l\right|^2}$$

$$IoT = |H_{s,k} \chi_k u'_k|^2$$

$$SINR_{s\,min} \geq 10 \log_{10} \frac{|H_{s,k} u_k|^2}{|w_s|^2 + \left|\sum_{i \neq k} H_{s,i} u_i\right|^2 + \left|\sum_{l \neq k} H_{s,l} \chi_l u'_l\right|^2 + IoT_{max}}$$

where terms may be defined, for example, as follows:

$y_s$: Received Signal at sth Sub-Carrier
$u_k$: Legacy Preamble Sequence sent by kth BS
$H_{s,k}$: Multi-Path Channel Impulse Response
$u'_k$: New Preamble Sequence sent by kth BS
$X_k$: kth Spreading Function
$w_s$: Received Noise at sth Sub-Carrier
$SINR_s$: Signal to Interference+Noise Ratios for Legacy Terminals $\sum_{l \neq k} H_{s,l} \chi_l u'_l$: Inter-Cell Interference due to New and Legacy Preambles Other criteria for the optimization of the IoT value may be used. In some embodiments, when legacy preambles 702 and 802 are code division multiplexed, transmitting new preamble 704 and 804, respectively, may have substantially no or minimal effect on the physical layer overhead of the system in which they are transmitted.

In such embodiments, superimposing new preamble 804 onto legacy preamble 802 respectively, may limit the received power 822 of new preamble 704 and may potentially interfere with or obscure system acquisitions of legacy preamble 802 by legacy terminals, for example, due to additional interference from new preambles transmitted by neighboring base stations or relay stations. The effect of additional interference may be minimized, for example, using robust preamble detection algorithms, for example, having minimal sensitivity to instantaneous degradation in the preamble power.

It may be appreciated by those skilled in the art that each of three options for embodiments of the structure of a super-frame and/or partitions thereof, including for example, embodiments described in reference to each of options I, II, and III, may be applied to both TDD and FDD duplex schemes. The size and distribution of the new and legacy zones and their corresponding DL and UL transmissions and/or sub-frames, may depend, for example, on factors including but not limited to the distribution of the new and legacy terminals, network load and performance optimizations for new and legacy terminals.

Figure 10:
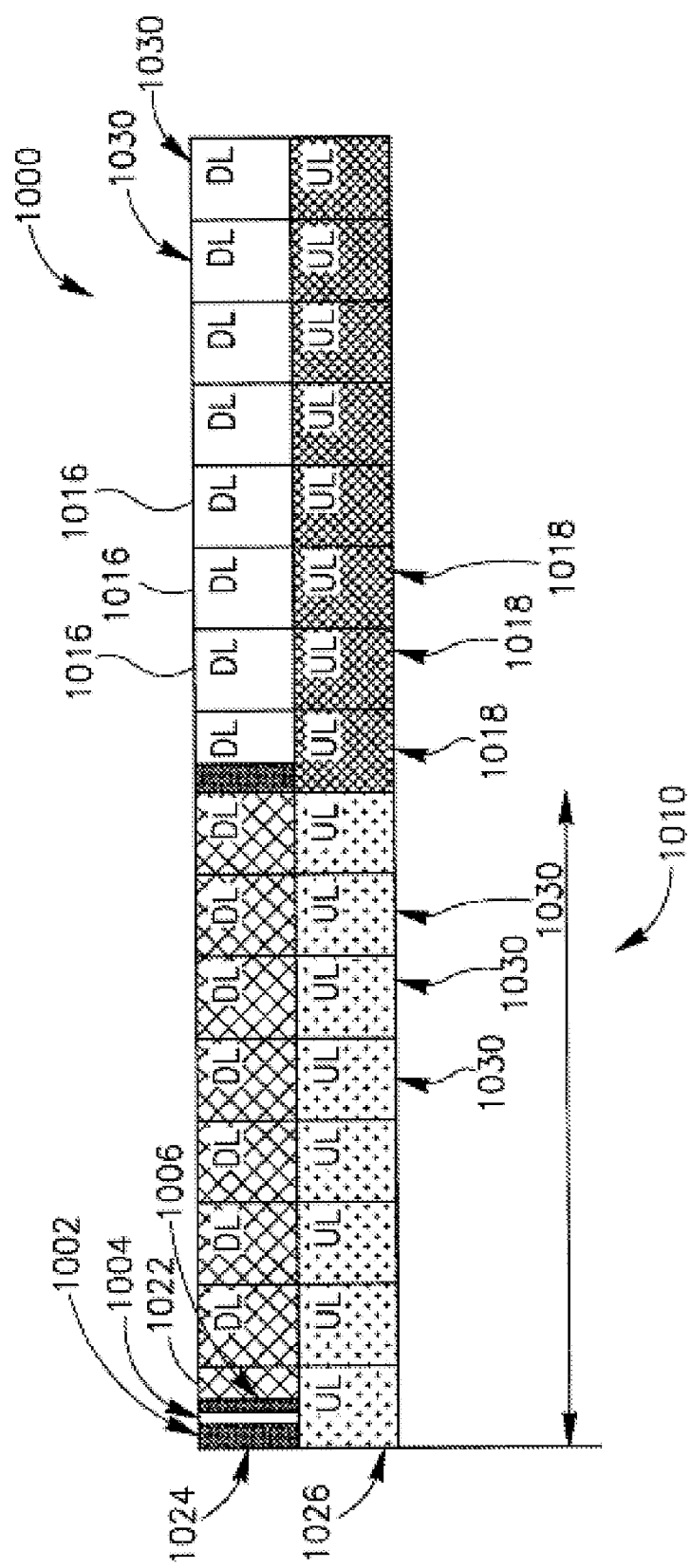
FIG. 10 is a schematic illustration of a frame structure in FDD duplex mode according to an embodiment of the present invention.

Reference is made to FIG. 10, which schematically illustrates a frame 1000 structure in FDD duplex mode according to an embodiment of the present invention. Frame 1000 may include sub-frames 1030. In some embodiments, super-frame 1000 may include a legacy preamble 1002, a new preamble 1004, and a BCH 1006, which may be transmitted every integer number of super-frame transmissions. In one embodiment, legacy preamble 1002, new preamble 1004, and/or BCH 1006 may be positioned at the beginning of frame 1000. According to embodiments of the invention, in the FDD duplex mode, DL transmissions 1016 and UL transmissions 1018 may occur substantially simultaneously, for example, at different frequencies (e.g., DL frequency $F_1$ 1024 and UL frequency $F_2$ 1026, respectively).

Figure 11:
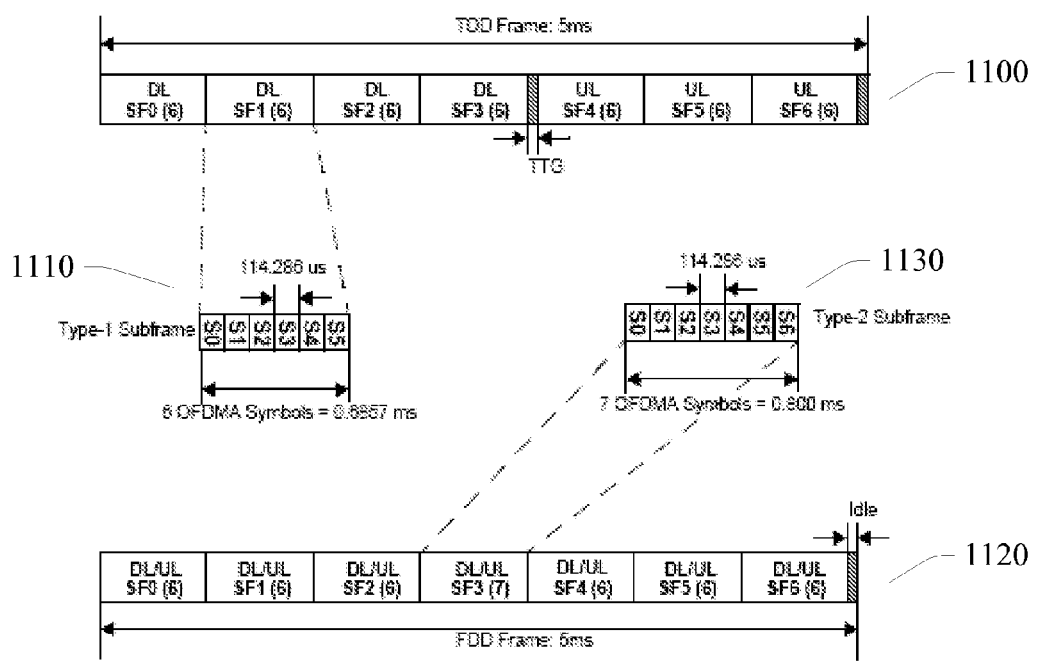
FIGS. 11-13 are schematic illustrations of frame structures, according to embodiments of the present invention.
Figure 12:
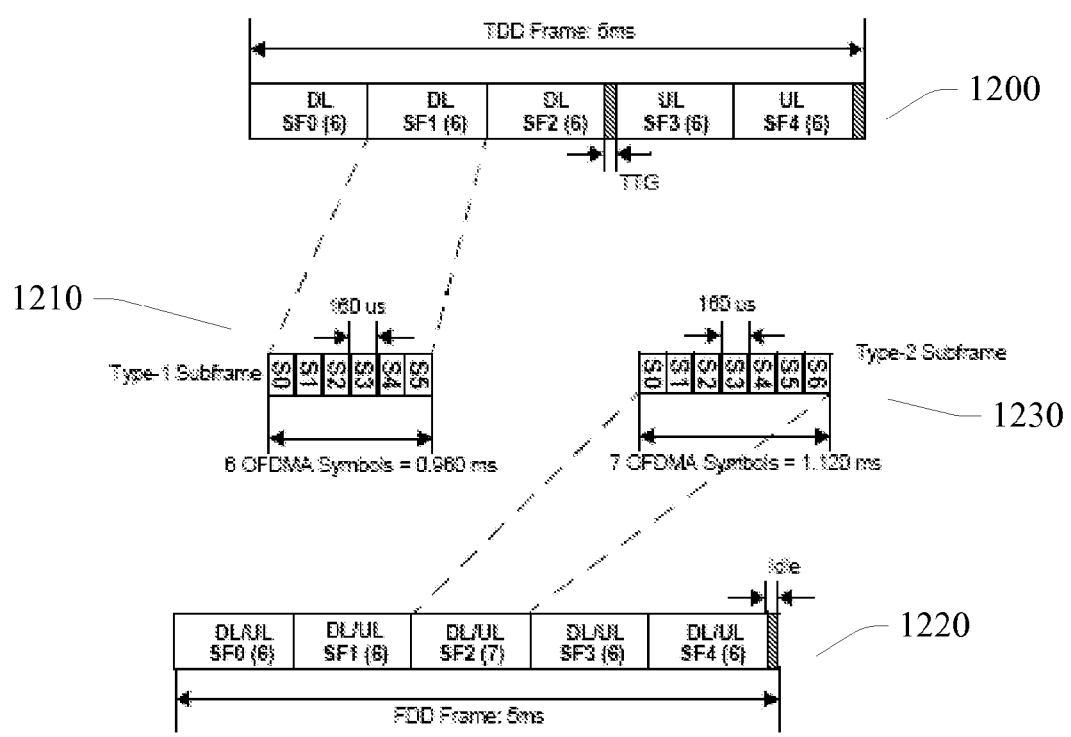
Figure 13:
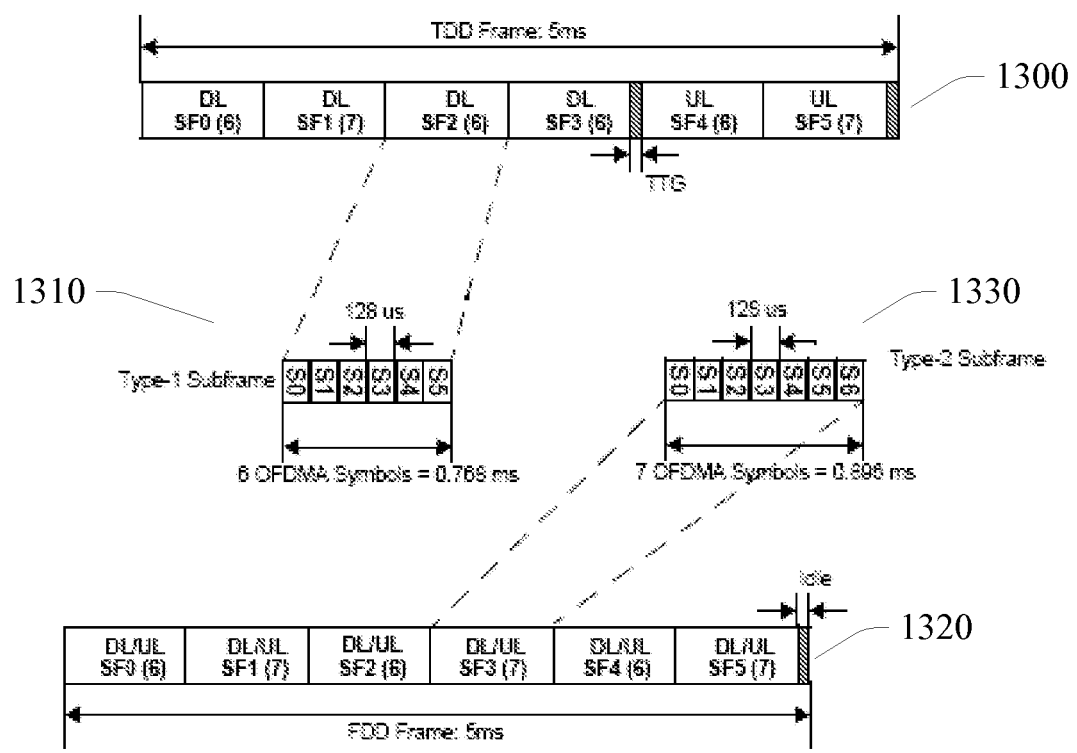

Reference is made to FIGS. 11-13, which schematically illustrate frame structures 1100, 1120, 1200, 1220, 1300, and 1320 and their respective sub-frames, 1110, 1130, 1210, 1230, 1310, and 1330, according to various embodiments of the present invention. In FIG. 11, TDD frame 1100 is shown with a DL/UL ratio of 4:3 and FDD frame 1120 for 5, 10 or 20 MHz channel bandwidth with a cyclic prefix of ¼ of useful OFDM symbol length. The TDD frame 1100 may consist of seven sub-frames 1110 of six OFDM symbols each and FDD frame 1120 may have the same configuration as the TDD frame to maximize commonality or may consists of six sub-frames 1110 of six OFDM symbols and one sub-frame 1130 of seven OFDM symbols. As an example, for an OFDM symbol duration of 114.386 microseconds (Tb) and a CP length of ¼ Tb, the length of six-symbol sub-frames 110 and seven-symbol sub-frames 1130 are 0.6857 ms and 0.80 ms, respectively. In this case, the transmit-to-receive transmission gap (TTG) and receive-to-transmit transmission gap (RTG) are 139.988 microseconds and 60 microseconds, respectively.

In FIG. 12, TDD frame 1200 is shown with a DL/UL ratio of 3:2 and FDD frame 1220 for 7 MHz channel bandwidth with a CP of ¼ Tb. The TDD frame 1200 may consist of five six-symbol sub-frames 1210 and the FDD frame 1220 may have the same structure as the TDD frame to maximize commonality or may consist of four six-symbol sub-frames 1210 and one seven-symbol sub-frame 1230. Assuming OFDM symbol duration of 160 microseconds and a CP length of ¼ Tb, the length of six-symbol sub-frame 1210 and seven-symbol sub-frame 1230 are 0.960 ms and 1.120 ms, respectively. The TTG and RTG are 140 microseconds and 60 microseconds, respectively.

In FIG. 13, TDD frame 1300 is shown with a DL/UL ratio of 4:2 and FDD frame 1320 for 8.75 MHz channel bandwidth with a CP of ¼ Tb. The TDD frame 1300 has four six-symbol sub-frames 1310 and two seven-symbol sub-frames 1330 and FDD frame 1320 has three six-symbol sub-frames 1310 and three seven-symbol sub-frame 1330. Assuming OFDM symbol duration of 128 microseconds and a CP length of ¼ Tb the length of six-symbol sub-frame 1310 and seven-symbol sub-frame 1330 are 0.768 ms and 0.896 ms, respectively. The number of OFDM symbols in a sub-frame may be related to, for example, the length of each OFDM symbol and/or the cyclic prefix value. However, to simplify the implementation of the system, it is desirable that all sub-frames within a frame have the same size and consists of the same number of OFDM symbols. Embodiments of the invention may be used having any suitable OFDMA numerology. It may be appreciated by those skilled in the art that although a variety of parameters (e.g., duplex modes, cyclic prefix values, OFDMA numerologies, etc.) may be used according to embodiments described herein, suitable variations may be used, for example, as depicted in the variations of FIGS. 11-13.

Figures 14, 15:
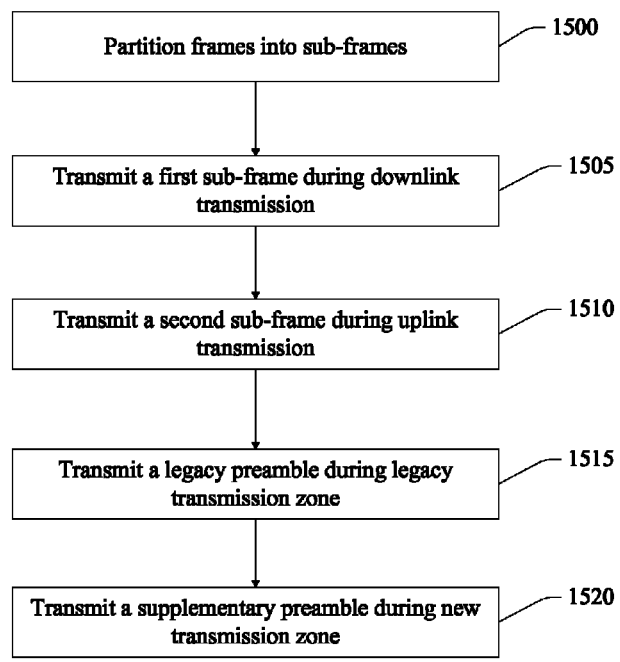
FIG. 14 is a table of OFDMA parameters according to embodiments of the present invention.
FIG. 15 is a flow chart of a method according to an embodiment of the present invention.

Reference is made to FIG. 14, which is a table of OFDMA parameters according to embodiments of the present invention. FIG. 14 lists parameters for a CP of ¼. The CP length of one quarter is equal to 22.85 microseconds (for bandwidths of 5, 10 or 20 MHz) which corresponds to a cell size of approximately 5 km. Therefore, a delay spread of up to 22.85 microseconds can be mitigated.

Reference is made to FIG. 15, which is a flow chart of a method according to an embodiment of the present invention.

In operation 1500, a processor in a terminal may partition each frame into two or more sub-frames. The frames (e.g., frames 410 described in reference to FIG. 4, or other frames) may be backward compatible with a reference system profile and for example, defined according to a reference standard system (e.g., IEEE Std 802.16-2009 or mobile WiMAX profiles). Thus, as compared with the frames from which sub-frames are partitioned, the sub-frames (e.g., sub-frames 420 described in reference to FIG. 4) may be shorter and therefore processed and transmitted/received faster with smaller periodicity. Transmitting according to the sub-frame structure may provide over the air communications having a periodicity on the scale of several sub-frames instead of the relatively longer periodicity of several frames.

In operation 1505, a transmitter may transmit one or more sub-frames during a pre-designated downlink transmission (e.g., pre-designated DL transmissions 306, described in reference to FIG. 3).

In operation 1510, the transmitter may transmit one or more sub-frames during a pre-designated uplink transmission (e.g., pre-designated UL transmissions 308, described in reference to FIG. 3)

In operation 1515, the transmitter may transmit one of the plurality of sub-frames including a legacy preamble for communicating with a legacy terminal, for example, operating according to the reference system profile during a pre-designated legacy transmission period or zone (e.g., legacy zone 612 and/or 616, described in reference to FIG. 6).

In operation 1520, the transmitter may transmit one of the plurality of sub-frames including a new preamble for communicating with a new (e.g., a non-legacy) terminal, for example, operating according to an evolved or newer version of the reference system standard, such as, the IEEE 802.16m standard, during a pre-designated new (e.g., a non-legacy)

transmission period or zone (e.g., new zone 614 and/or 618, described in reference to FIG. 6).

In various embodiments, the first and second signals may be transmitted in a TDD duplex mode or an FDD duplex mode. In some embodiments, when the signals are transmitted in a TDD duplex mode, operations 1505 and 1510 may be executed over substantially different time intervals, or frame positions, such that the first and second signals may be transmitted separately. In other embodiments, when the when the signals are transmitted in an FDD duplex mode, operations 1505 and 1510 may be executed in substantially overlapping time periods, such that the first and second signals may be transmitted over substantially distinct frequencies and/or channels.

In some embodiments, the sub-frames may be further partitioned into two or more (e.g., six) information-carrying, multiplexing, and/or OFDM symbols.

In some embodiments, the first and second signals may include a legacy preamble for communicating with legacy terminals operating according to the reference system profile and a new preamble for communicating with a new (e.g., a non-legacy) terminal operating according to a second system standard and/or an evolved version of the reference system. In one embodiment, each of the first and second sub-frames may be pre-designated for communicating with one of a legacy terminal, a non-legacy terminal, or both a legacy and non-legacy terminal. For example, one of two or more sub-frames in operation 1510 may be pre-designated for communicating with both a legacy and a non-legacy terminal.

In some embodiments, the beginning of the frames, which may be pre-designated for communicating with legacy terminals and non-legacy terminals, may be offset, for example, by a fixed number of sub-frames.

In some embodiments, a super-frame may be defined. For example, the super-frame may include two or more frames (e.g., the frames described in operation 1500) that may be transmitted in succession. In one embodiment, the new preamble may be transmitted substantially once during the transmission of each super-frame. In one embodiment, the new preamble may be transmitted substantially once every frame.

According to embodiments such as that of Option I described herein, the legacy preamble and the new preamble may be transmitted separately, for example, at a substantially fixed distance apart along the length of the frame.

In one embodiment, a process may execute operations 1500, 1505, and 1510 and need not execute operations 1515 and 1520. In another embodiment, a process may execute operations 1500, 1515, and 1520 and need not execute operations 1505 and 1510. In yet another embodiment, a process may execute operations 1500, 1505, 1510, 1515, and 1520. The process may execute other sequences, orders, and/or permutations of operations described herein.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by skilled in the art that the appended claims are intended to cover all such modifications and changes as fall within the true spirit of the invention.

What is claimed is:

1. A method for base station (eNB) to relay node (RN) (eNB-RN) transmissions in accordance with an orthogonal frequency division multiple access (OFDMA) technique, the method comprising:
    configuring sub-frames in accordance with an uplink-downlink configuration and a subframe configuration for an eNB to RN transmission, each sub-frame comprising slots for transmitting signals within resource blocks, wherein a cyclic prefix (CP) having a predetermined length is appended to each symbol of the sub-frames;
    transmitting symbols of the sub-frames that are pre-designated for downlink transmission based on the uplink-downlink configuration and the subframe configuration; and
    configuring the subframes in accordance with a slot configuration, the slot configuration to restrict transmissions to a subset of symbols in a slot,
    wherein the slot configuration indicates a start symbol index and an end symbol index for at least one of a first slot and a second slot of a resource block, and
    wherein the uplink-downlink configuration and the subframe configuration define a frame structure that indicates which sub-frames of a frame are downlink subframes pre-designated for eNB-RN transmissions and which subframes are uplink subframes pre-designated for RN-eNB transmissions.

2. The method of claim 1 wherein the subset of symbols in each slot is limited to either six or seven symbols based on the slot configuration, and
    wherein the method further comprises determining the slot configuration based on whether sub-frame boundaries with a RN are time-aligned.

3. A method for base station (eNB) to relay node (RN) (eNB-RN) transmissions in accordance with an orthogonal frequency division multiple access (OFDMA) technique, the method comprising:
    configuring sub-frames in accordance with an uplink-downlink configuration and a subframe configuration for an eNB to RN transmission, each sub-frame comprising slots for transmitting signals within resource blocks, wherein a cyclic prefix (CP) having a predetermined length is appended to each symbol of the sub-frames; and
    transmitting symbols of the sub-frames that are pre-designated for downlink transmission based on the uplink-downlink configuration and the subframe configuration; and
    determining the uplink-downlink configuration and the subframe configuration from a plurality of an uplink-downlink configurations and a plurality of subframe configurations for the eNB to RN transmission,
    wherein the uplink-downlink configuration and the subframe configuration define a frame structure that indicates which sub-frames of a frame are downlink subframes pre-designated for eNB-RN transmissions and which subframes are uplink subframes pre-designated for RN-eNB transmissions.

4. A method for base station (eNB) to relay node (RN) (eNB-RN) transmissions in accordance with an orthogonal frequency division multiple access (OFDMA) technique, the method comprising:
    configuring the sub-frames in accordance with an uplink-downlink configuration and a subframe configuration for an eNB to RN transmission, each sub-frame comprising slots for transmitting signals within resource blocks, wherein a cyclic prefix (CP) having a predetermined length is appended to each symbol of the sub-frames; and transmitting symbols of the sub-frames that are pre-designated for downlink transmission based on the uplink-downlink configuration and the subframe configuration, wherein the uplink-downlink configuration and the sub-frame configuration define a frame structure that indicates which sub-frames of a frame are downlink sub-frames pre-designated for eNB-RN transmissions and which subframes are uplink subframes pre-designated for RN-eNB transmissions, and wherein the uplink-downlink configuration and the sub-frame configuration further indicates which sub-frames of the frame are not pre-designated for RN operations.

5. The method of claim 4 further comprising receiving symbols within the sub-frames from a RN that are pre-designated for uplink transmissions based on the uplink-downlink configuration and the subframe configuration.

6. The method of claim 4 wherein a length of the cyclic prefix is selected based on a delay spread of the channel.

7. The method of claim 4 further comprising using a time division duplex mode for transmitting sub-frames.

8. The method of claim 4 further comprising using a frequency division duplex mode for transmitting sub-frames.

9. A base station configured for relay node (RN) transmissions in accordance with an orthogonal frequency division multiple access (OFDMA) technique, the base station comprising:

processing circuitry to configure sub-frames in accordance with an uplink-downlink configuration and a subframe configuration for a RN transmission, each subframe comprising slots for transmitting signals within resource blocks, wherein a cyclic prefix (CP) having a predetermined length is appended to each symbol of the sub-frames; and physical-layer circuitry to transmit symbols of the sub-frames that are pre-designated for downlink transmission based on the uplink-downlink configuration and the subframe configuration, wherein the uplink-downlink configuration and the sub-frame configuration define a frame structure that indicates which sub-frames of a frame are downlink sub-frames pre-designated for eNB-RN transmissions and which subframes are uplink subframes pre-designated for RN-eNB transmissions, wherein the processing circuitry is to further configure the subframes in accordance with a slot configuration, the slot configuration to restrict transmissions to a subset of symbols in a slot, and wherein the slot configuration indicates a start symbol index and an end symbol index for at least one of a first slot and a second slot of a resource block.

10. The base station of claim 9 wherein the subset of symbols in each slot is limited to either six or seven symbols based on the slot configuration, and wherein the processing circuitry is to determine the slot configuration based on whether sub-frame boundaries with a RN are time-aligned.

11. The base station of claim 10 wherein the first slot and the second slot are configured for transmission in accordance with the Generation Partnership Project (3GPP) Long Term Evolution (LTE) standard.

12. Processing circuitry for configuring sub-frames for base station (eNB) to relay node (RN) (eNB-RN) transmissions in accordance with an orthogonal frequency division multiple access (OFDMA) technique, the processing circuitry comprising:

circuitry to configure sub-frames in accordance with a slot configuration for an eNB to RN transmission, the slot configuration to restrict transmissions to a subset of symbols in a slot; and circuitry to configure symbols of the sub-frames for transmission at least in accordance with the slot configuration, wherein the slot configuration indicates a start symbol index and an end symbol index for at least one of a first slot and a second slot of a resource block.

13. The processing circuitry of claim 12 wherein the subset of symbols in each slot is limited to either six or seven symbols based on the slot configuration.

14. The processing circuitry of claim 13, wherein the processing circuitry is further configured to determine the slot configuration based on whether sub-frame boundaries with a RN are time-aligned.

15. The processing of claim 14 wherein the processing circuitry is further configured to configure the sub-frames in accordance with an uplink-downlink configuration and a subframe configuration for the eNB to RN transmission, each sub-frame comprising slots for transmitting signals within resource blocks.

16. The processing circuitry of claim 15 wherein the uplink-downlink configuration and the subframe configuration define a frame structure that indicates which sub-frames of a frame are downlink subframes pre-designated for eNB-RN transmissions, which subframes are uplink subframes pre designated for RN-eNB transmissions, and which subframes are not pre-designated for RN operations.

17. A method for transmissions between a base station and a relay station in accordance with an orthogonal frequency division multiplexing technique, the method comprising:

configuring sub-frames for transmission of symbols from the base station to the relay station in a wireless wide area network in accordance with an uplink-downlink configuration and a sub-frame configuration, each sub-frame of a frame comprising slots for resource blocks;

adding a cyclic prefix to each of the symbols;

transmitting the symbols in the sub-frames that are pre-designated for downlink transmission based on the uplink-downlink configuration and the sub-frame configuration, wherein the uplink-downlink configuration and the sub-frame configuration define a frame structure to indicate which sub-frames of the frame are downlink sub-frames pre-designated for base station to relay station transmissions and which sub-frames are uplink sub-frames pre-designated for relay station to base station transmissions; and configuring one or more of the sub-frames to include a subset of the symbols, wherein each slot is limited to either six or seven symbols based on a slot configuration.

18. The method of claim 17 further comprising determining the uplink-downlink configuration from a plurality of uplink-downlink configurations.

19. A method for transmissions between a base station and a relay station in accordance with an orthogonal frequency division multiplexing technique, the method comprising:

configuring sub-frames for transmission of symbols from the base station to the relay station in a wireless wide area network in accordance with an uplink-downlink configuration and a sub-frame configuration, each sub-frame of a frame comprising slots for resource blocks;

adding a cyclic prefix to each of the symbols; and transmitting the symbols in the sub-frames that are pre-designated for downlink transmission based on the uplink-downlink configuration and the sub-frame configuration, wherein the uplink-downlink configuration and the sub-frame configuration define a frame structure to indicate which sub-frames of the frame are downlink sub-frames pre-designated for base station to relay station transmissions and which sub-frames are uplink sub-frames pre-designated for relay station to base station transmissions, wherein the uplink-downlink configuration and the sub-frame configuration further indicates which sub-frames of the frame are not pre-designated for relay station operations.

20. The method of claim 19 further comprising transmitting configuration information of the frame structure from the base station to the relay station over a control channel.

21. A method for transmissions between a base station and a relay station in accordance with an orthogonal frequency division multiplexing technique, the method comprising:

configuring sub-frames for transmission of symbols from the base station to the relay station in a wireless wide area network in accordance with an uplink-downlink configuration and a sub-frame configuration, each sub-frame of a frame comprising slots for resource blocks;

adding a cyclic prefix to each of the symbols; and transmitting the symbols in the sub-frames that are pre-designated for downlink transmission based on the uplink-downlink configuration and the sub-frame configuration, wherein the uplink-downlink configuration and the sub-frame configuration define a frame structure to indicate which sub-frames of the frame are downlink sub-frames pre-designated for base station to relay station transmissions and which sub-frames are uplink sub-frames pre-designated for relay station to base station transmissions, wherein the frame structure further comprises primary synchronization sequences and secondary synchronization sequences to communicate with a legacy terminal and a non-legacy terminal.

22. The method of claim 21 further comprising using a time division duplex mode for transmitting sub-frames.

23. The method of claim 21 further comprising using a frequency division duplex mode for transmitting sub-frames.

24. Processing circuitry for medium access control layer processing comprising circuitry to configure a frame structure for transmission of signals in a wireless wide area network, the frame structure comprising an idle time sub-frame, an uplink sub-frame, and a downlink sub-frame comprising two slots, wherein each slot is configured for orthogonal frequency division multiplexing (OFDM) symbols having a cyclic prefix, wherein a number of OFDM symbols in each slot is determined according to a cycle prefix length, wherein the frame structure further comprises primary synchronization sequences and secondary synchronization sequences to communicate with a legacy terminal and a non-legacy terminal, and wherein each slot is limited to either six or seven symbols based in a slot configuration.

25. The processing circuitry of claim 24, wherein the processing circuitry is further adapted to communicate with a radio frequency interface.

26. The processing of claim 25 wherein the processing circuitry is further configured to configure the sub-frames in accordance with an uplink-downlink configuration for transmissions between a base station and a relay station, each sub-frame comprising slots for transmitting the signals within resource blocks.

27. The processing circuitry of claim 26 wherein the uplink-downlink configuration and the sub-frame configuration define a frame structure to indicate which sub-frames of a frame are downlink sub-frames pre-designated for base station to relay station transmissions, which sub-frames are uplink sub-frames pre designated for relay station to base station transmissions and which sub-frames are not pre-designated for relay station operations.

* * * * *

UNITED STATES PATENT AND TRADEMARK OFFICE
CERTIFICATE OF CORRECTION

PATENT NO. : 8,634,334 B2
APPLICATION NO. : 13/530686
DATED : January 21, 2014
INVENTOR(S) : Sassan Ahmadi It is certified that error appears in the above-identified patent and that said Letters Patent is hereby corrected as shown below:

On the Title Page, Item (56)

On page 2, in column 1, under "Other Publications", line 4, delete "1 pgs." and insert --1 pg.--, therefor On page 2, in column 2, under "Other Publications", line 9, before "Japanese", insert --"--, therefor On page 2, in column 2, under "Other Publications", line 10, delete "2013." and insert --2013".--, therefor On page 2, in column 2, under "Other Publications", line 11, before "Korean", insert --"--, therefor On page 2, in column 2, under "Other Publications", line 12, delete "2013," and insert --2013",--, therefor On page 2, in column 2, under "Other Publications", line 13, before "Russian", insert --"--, therefor On page 2, in column 2, under "Other Publications", line 14, delete "2013." and insert --2013".--, therefor On page 2, in column 2, under "Other Publications", line 15, before "Taiwanese", insert --"--, therefor On page 2, in column 2, under "Other Publications", line 16, delete "2013," and insert --2013",--, therefor On page 2, in column 2, under "Other Publications", line 17, before "Taiwanese", insert --"--, therefor On page 2, in column 2, under "Other Publications", line 18, delete "2013," and insert --2013",--, therefor Signed and Sealed this
Twenty-fifth Day of November, 2014

Michelle K. Lee
*Deputy Director of the United States Patent and Trademark Office*

CERTIFICATE OF CORRECTION (continued)
U.S. Pat. No. 8,634,334 B2

In the Claims

In column 18, line 17, in claim 1, after "configuring", delete "the", therefor

In column 18, line 64, in claim 4, after "configuring", delete "the", therefor

In column 19, line 32, in claim 9, delete "subframe" and insert --sub-frame--, therefor In column 20, line 7, in claim 12, after "and", insert --¶--, therefor In column 22, line 26, in claim 26, delete "to" and insert --to:--, therefor